US009452775B2

United States Patent
Tamura et al.

(10) Patent No.: US 9,452,775 B2
(45) Date of Patent: Sep. 27, 2016

(54) CONTROL SYSTEM FOR AN ELECTRIC POWER STEERING SYSTEM

(71) Applicant: JTEKT CORPORATION, Osaka-shi, Osaka (JP)

(72) Inventors: Tsutomu Tamura, Nara (JP); Robert Fuchs, Louveciennes (FR)

(73) Assignee: JTEKT CORPORATION, Osaka (JP)

( * ) Notice: Subject to any disclaimer, the term of this patent is extended or adjusted under 35 U.S.C. 154(b) by 0 days.

(21) Appl. No.: 14/081,566

(22) Filed: Nov. 15, 2013

(65) Prior Publication Data

US 2014/0149000 A1    May 29, 2014

(30) Foreign Application Priority Data

Nov. 26, 2012   (JP) .................................. 2012-257462
Sep. 13, 2013   (JP) .................................. 2013-191024

(51) Int. Cl.
   *B62D 5/04*   (2006.01)
(52) U.S. Cl.
   CPC ........... *B62D 5/0481* (2013.01); *B62D 5/0463* (2013.01)
(58) Field of Classification Search
   CPC ........................... B62D 5/0463; B62D 5/0481
   USPC ..................................................... 701/42, 41
   See application file for complete search history.

(56) References Cited

U.S. PATENT DOCUMENTS

2002/0026267 A1   2/2002   Kifuku

FOREIGN PATENT DOCUMENTS

| JP | A-2000-103349 | 4/2000 |
| JP | A-2003-170856 | 6/2003 |
| JP | A-2003-291834 | 10/2003 |

OTHER PUBLICATIONS

Tamura et al., Active Compensation of Friction in Electric Power Steering, Oct. 28, 2012,Springer-Verlag Berlin Heidelberg, Proceedings of the FISITA 2012 World Automotive Congress: vol. 10.*
Masato Abe, "Automotive Vehicle Dynamics, Theory and Applications", Tokyo Denki University Press, Sep. 20, 2009, pp. 60-61.
Jan. 11, 2016 Extended Search Report issued in European Patent Application No. 13193985.2.

* cited by examiner

*Primary Examiner* — John Q Nguyen
*Assistant Examiner* — Nadeem Odeh
(74) *Attorney, Agent, or Firm* — Oliff PLC

(57) ABSTRACT

A friction compensation control unit includes a contact state determination unit that determines the contact state of a speed reducer, a friction coefficient estimation unit that estimates a friction coefficient of a power column, and a frictional force estimation unit that estimates a frictional force generated in the power column. The contact state determination unit determines the contact state of the speed reducer based on a first assist torque command value, a detected steering torque, and an estimated load torque. The friction coefficient estimation unit estimates a friction coefficient of the power column based on an estimated motor angular velocity. The friction force estimation unit computes a second assist torque correction value based on the result of determination made by the contact state determination unit, the friction coefficient, the detected steering torque, the estimated load torque, and the estimated motor angular velocity.

16 Claims, 13 Drawing Sheets

CONTROL SYSTEM FOR AN ELECTRIC POWER STEERING SYSTEM

INCORPORATION BY REFERENCE

The disclosure of Japanese Patent Application No. 2012-257462 filed on Nov. 26, 2012 and No. 2013-191024 filed on Sep. 13, 2013, each including the specification, drawings, and abstract, is incorporated herein by reference in its entirety.

BACKGROUND OF THE INVENTION

1. Field of the Invention

The invention relates to a control system including an electric motor and a speed reducer that amplifies motor torque generated by the electric motor. An example of such a control system is an electric power steering system (EPS).

2. Description of the Related Art

A column assist-type electric power steering system in which an electric motor and a speed reducer are arranged at a column part has been known as an electric power steering system. Hereinafter, such a system will be referred to as a column-type EPS. The column-type EPS includes, for example, a steering wheel, a steering shaft, an intermediate shaft, a steered mechanism, an electric motor, and a speed reducer. The steering shaft is formed of an input shaft connected to the steering wheel, an output shaft connected to the intermediate shaft, and a torsion bar that connects the input shaft and the output shaft to each other. The electric motor is connected to the output shaft via the speed reducer.

A column in this specification means a part including a steering wheel, an input shaft, a torsion bar, and an output shaft. A power column in this specification means a part including a steering wheel, an input shaft, a torsion bar, an output shaft, a speed reducer, an electric motor, and a control device for the electric motor. A typical column-type EPS in this specification means a column-type EPS that does not have a function of compensating for friction of the speed reducer.

In a typical column-type EPS, motor torque generated by an electric motor is transmitted to an output shaft via a speed reducer. Hereinafter, the motor torque that is transmitted to the output shaft will be referred to as an assist torque. The assist torque transmitted to the output shaft is then transmitted via an intermediate shaft to a steered mechanism including, for example, a rack-and-pinion mechanism. The speed reducer is, for example, a worm gear formed of a worm and a worm wheel. Because friction generated in the speed reducer is large, a response of steering to a steering input may deteriorate due to the influence of the friction.

Therefore, a method of compensating for friction generated in a speed reducer has been developed in order to improve a response of steering to a steering input. A simplest friction compensation method is a method in which a certain value of frictional force is added to an assist torque command value depending on a sign of a steering velocity.

Japanese Patent Application Publication No. 2003-170856 (JP 2003-170856 A), Japanese Patent Application Publication No. 2000-103349 (JP 2000-103349 A), and Japanese Patent Application Publication No. 2003-291834 (JP 2003-291834 A) each describe a method of compensating for friction on the basis of an assist torque command value, which is computed on the basis of a detected steering torque detected by a torque sensor, and the detected steering torque. Specifically, the magnitude of a frictional force of a speed reducer is estimated on the basis of the assist torque command value. The sign of the frictional force of the speed reducer is determined on the basis of the detected steering torque. The frictional force of the speed reducer is estimated in this way. The value of the estimated frictional force of the speed reducer is added to the assist torque command value.

SUMMARY OF THE INVENTION

One object of the invention is to provide a control system capable of compensating for friction generated in a speed reducer by a novel friction compensation method.

1) A control system according to an aspect of the invention is a control system including an electric motor and a speed reducer that amplifies motor torque generated by the electric motor, the control system further including:

a basic motor torque command value computation unit that computes a basic motor torque command value for the electric motor;

an external torque specifying unit that specifies external torque that is applied to the speed reducer and that is other than the motor torque;

a motor angular velocity computation unit that computes an angular velocity of the electric motor with use of a model formed on an assumption that friction is not generated in the speed reducer or with use of a model obtained by modifying the model formed on the assumption that friction is not generated in the speed reducer, based on an actually-measured motor angular velocity;

a friction compensation control unit that estimates friction to be compensated for, with use of the external torque specified by the external torque specifying unit, the angular velocity computed by the motor angular velocity computation unit, the basic motor torque command value computed by the basic motor torque command value computation unit, and a simulation model of the control system in which the friction to be compensated for including at least friction generated in the speed reducer out of friction generated in the control system is taken into account;

a motor torque command value computation unit that computes a motor torque command value that is a target value of the motor torque to be generated from the electric motor, with use of the friction estimated by the friction compensation control unit and the basic motor torque command value computed by the basic motor torque command value computation unit;

and a controller that controls the electric motor based on the motor torque command value computed by the motor torque command value computation unit.

According to the aspect of the invention, the friction to be compensated for, is estimated with use of the external torque that is applied to the speed reducer and that is other than the motor torque, the angular velocity of the electric motor in the case where the assumption is made that friction is not generated in the speed reducer, and the simulation model of the control system. Then, the motor torque command value is computed with use of the estimated friction and the basic motor torque command value. Thus, it is possible to compensate for the friction generated in the speed reducer by the novel friction compensation method.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
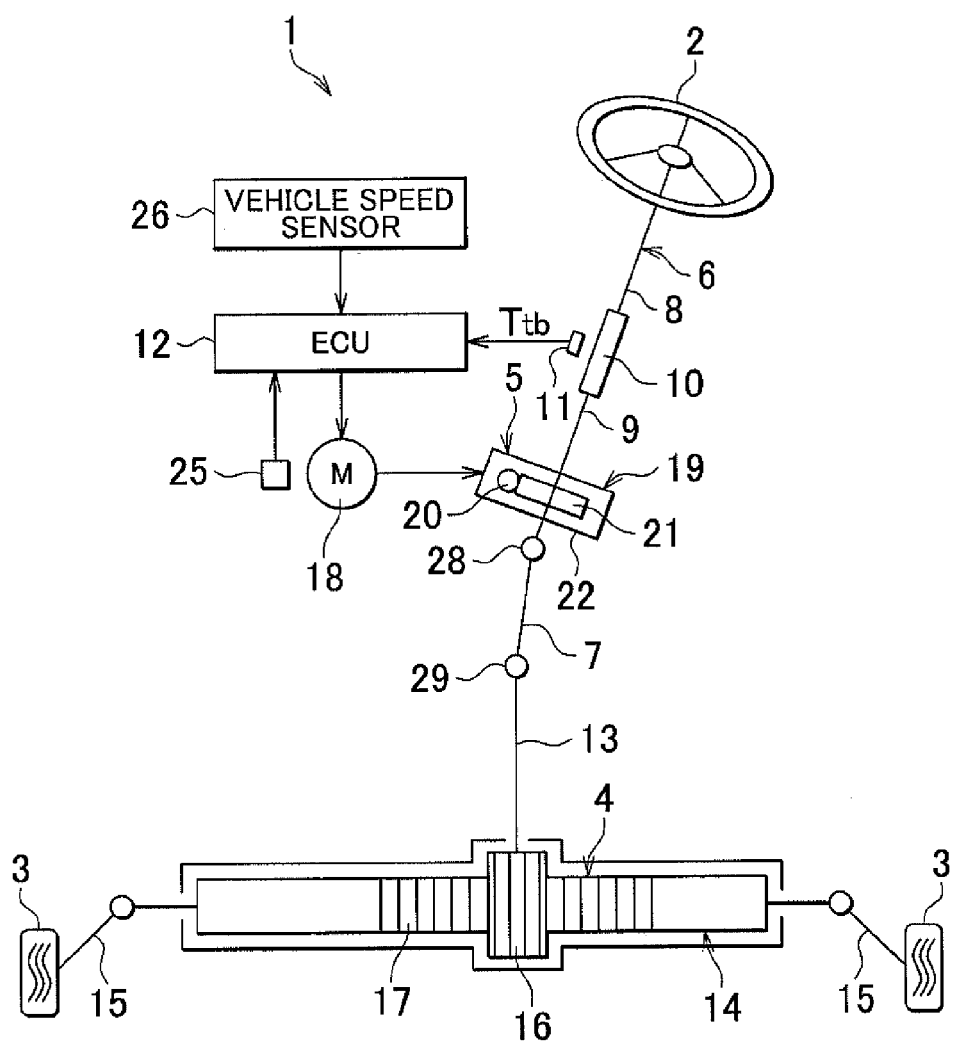
FIG. 1 is a schematic diagram illustrating the configuration of a column-type EPS according to an embodiment of the invention.

Hereinafter, embodiments in which the invention is applied to a column-type EPS will be described in detail with reference to the accompanying drawings. FIG. 1 is a schematic diagram illustrating the configuration of a column-type EPS 1 according to an embodiment of the invention. The column-type EPS 1 includes a steering wheel 2 that serves as a steering member for steering a vehicle, a steered mechanism 4 that steers steered wheels 3 in response to the rotation of the steering wheel 2, and a steering assist mechanism 5 that assists a driver's steering operation. The steering wheel 2 and the steered mechanism 4 are mechanically connected to each other via a steering shaft 6, a first universal joint 28, an intermediate shaft 7, and a second universal joint 29.

The steering shaft 6 includes an input shaft 8 connected to the steering wheel 2 and an output shaft 9 connected to the intermediate shaft 7. The input shaft 8 and the output shaft 9 are connected to each other via a torsion bar 10 so as to be rotatable relative to each other on the same axis. That is, when the steering wheel 2 is rotated, the input shaft 8 and the output shaft 9 rotate in the same direction while rotating relative to each other. The output shaft 9 is connected to the intermediate shaft 7 via the first universal joint 28.

A torque sensor 11 is disposed around the steering shaft 6. The torque sensor 11 detects a torsion bar torque applied to the torsion bar 10 on the basis of a relative rotational displacement between the input shaft 8 and the output shaft 9. Hereinafter, the torsion bar torque will be referred to as a steering torque $T_{tb}$. The steering torque $T_{tb}$ detected by the torque sensor 11 is input into an electronic control unit 12. Hereinafter, the electronic control unit will be referred to as an ECU.

The steered mechanism 4 is formed of a rack-and-pinion mechanism including a pinion shaft 13 and a rack shaft 14 that serves as a steered shaft. The steered wheels 3 are connected to respective ends of the rack shaft 14 via tie rods 15 and knuckle arms (not illustrated). The pinion shaft 13 is connected to the intermediate shaft 7 via the second universal joint 29. The pinion shaft 13 rotates in response to a steering operation of the steering wheel 2. A pinion 16 is connected to a distal end of the pinion shaft 13.

The rack shaft 14 extends linearly along the lateral direction of a vehicle. The lateral direction is a direction perpendicular to a direction in which the vehicle travels straight ahead. A rack 17 that engages with the pinion 16 is formed in an intermediate portion of the rack shaft 14 in its axial direction. The rotation of the pinion shaft 13 is converted into an axial movement of the rack shaft 14 by the pinion 16 and the rack 17. The steered wheels 3 are steered by moving the rack shaft 14 in the axial direction.

When the steering wheel 2 is steered, the rotation thereof is transmitted to the pinion shaft 13 via the steering shaft 6 and the intermediate shaft 7. The rotation of the pinion shaft 13 is converted into an axial movement of the rack shaft 14 by the pinion 16 and the rack 17. Thus, the steered wheels 3 are steered. The steering assist mechanism 5 includes an electric motor 18 that generates a steering assist force and a speed reducer 19 that amplifies the torque output from the electric motor 18 and transmits the amplified torque to the steered mechanism 4. In the present embodiment, the electric motor 18 is formed of a three-phase brushless motor. The speed reducer 19 is formed of a worm gear including a worm 20 and a worm wheel 21 engaged with the worm 20. The speed reducer 19 is accommodated in a gear housing 22 that serves as a transmission mechanism housing.

The worm 20 is driven to be rotated by the electric motor 18. The worm wheel 21 is connected to the steering shaft 6 so as to be rotatable in the same direction as the rotation direction of the steering shaft 6. The worm wheel 21 is driven to be rotated by the worm 20. The worm 20 is driven to be rotated by the electric motor 18. Thus, the worm wheel 21 is driven to be rotated, and the motor torque is applied to the steering shaft 6, causing the steering shaft 6 to rotate. The rotation of the steering shaft 6 is transmitted to the pinion shaft 13 via the intermediate shaft 7. The rotation of the pinion shaft 13 is converted into an axial movement of the rack shaft 14. Thus, the steered wheels 3 are turned. That is, when the worm 20 is driven to be rotated by the electric motor 18, it is possible to realize steering assist with the use of the electric motor 18.

The torque applied to the speed reducer 19 includes motor torque generated by the electric motor 18 and external torque other than the motor torque. The external torque other than the motor torque includes steering torque applied to the steering wheel 2 by a driver and load torque applied to the rack shaft 14 and the speed reducer 19 from the steered wheel 3 side.

A rotation angle of a rotor of the electric motor 18 is detected by a rotation angle sensor 25 such as a resolver. A vehicle speed is detected by a vehicle speed sensor 26. A signal output from the rotation angle sensor 25 and a vehicle speed V detected by the vehicle speed sensor 26 are input into the ECU 12. The electric motor 18 is controlled by the ECU 12 that serves as a motor controller.

Figure 2:
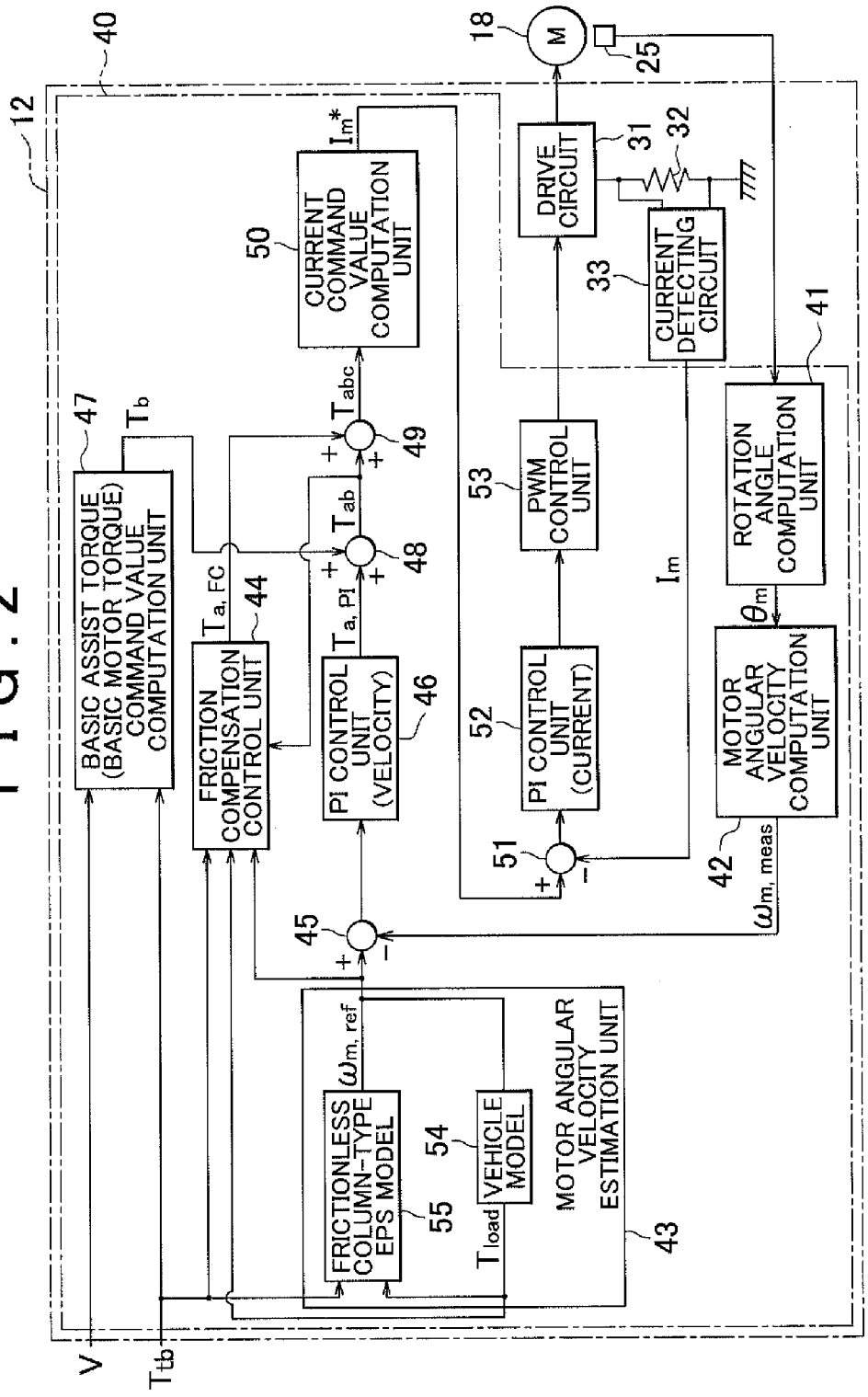
FIG. 2 is a schematic diagram illustrating the electrical configuration of an ECU in FIG. 2.

FIG. 2 is a schematic diagram illustrating the electrical configuration of the ECU 12. The ECU 12 realizes steering assist suitable for the steering state by driving the electric motor 18 on the basis of the detected steering torque $T_{tb}$ detected by the torque sensor 11, the vehicle speed V detected by the vehicle speed sensor 26, and a rotation angle $\theta_m$ of the electric motor 18 computed on the basis of an output from the rotation angle sensor 25. The ECU 12 realizes friction compensation for reducing the influence of friction in a power column by controlling driving of the electric motor 18. In the present embodiment, the electric motor 18 is a direct-current (DC) motor with a brush.

The ECU 12 includes a microcomputer 40, a drive circuit 31 that is controlled by the microcomputer 40 and that supplies electric power to the electric motor 18, and a current sensing resistor 32 and a current detecting circuit 33 that are used to detect a current passing through the electric motor 18. Hereinafter, the current passing through the electric motor 18 will be referred to as a motor current. The microcomputer 40 includes a CPU and memories, and serves as multiple functional processing units by executing predetermined programs. The memories include a ROM, a RAM, a nonvolatile memory, and the like. The multiple functional processing units include a rotation angle computation unit 41, a motor angular velocity computation unit 42, a motor angular velocity estimation unit 43 in which mathematical models are used, a friction compensation control unit 44, an angular velocity deviation computation unit 45, a PI control unit 46, a basic assist torque command value computation unit 47, a first addition unit 48, a second addition unit 49, a current command value computation unit 50, a current deviation computation unit 51, a PI control unit 52, and a PWM control unit 53. PI is an abbreviation for proportional integral, and PWM is an abbreviation for pulse width modulation.

The rotation angle computation unit 41 computes a rotation angle $\theta_m$ of the electric motor 18 on the basis of a signal output from the rotation angle sensor 25. The motor angular velocity computation unit 42 computes an angular velocity of a rotor of the electric motor 18 by subjecting the rotation angle $\theta_m$, which is computed by the rotation angle computation unit 41, to temporal differentiation. Hereinafter, the angular velocity of the rotor of the electric motor will be referred to as an actual motor angular velocity $\omega_{m,meas}$. The motor angular velocity estimation unit 43 estimates an angular velocity (hereinafter, referred to as "estimated motor angular velocity $\omega_{m,ref}$") of the rotor of the electric motor 18 when the assumption is made that friction is not generated in the power column, on the basis of the detected steering torque $T_{tb}$ detected by the torque sensor 11, and includes a mathematical vehicle model 54 and a mathematical frictionless column-type EPS model 55. Hereinafter, the angular velocity of the rotor of the electric motor estimated by the motor angular velocity estimation unit 43 will be referred to as an estimated motor angular velocity $\omega_{m,ref}$. In the present embodiment, the vehicle model 54 is a two-wheeled model described in "Automotive Vehicle Dynamics, Theory and Applications", written by Masato ABE, published by the Tokyo Denki University Press, second printing of the first edition, Sep. 20, 2009. The two-wheeled model is a model equivalent to a four-wheeled vehicle.

The vehicle model 54 receives, as an input, the estimated motor angular velocity $\omega_{m,ref}$ computed by the frictionless column-type EPS model 55, and outputs an estimated load torque $T_{load}$. The estimated load torque $T_{load}$ is a value obtained by converting an estimated value of a load applied from the steered wheel 3 side to the rack shaft 14, into a load torque of the power column.

The frictionless column-type EPS model 55 is a virtual column-type EPS model in which friction is not generated in the power column. The frictionless column-type EPS model 55 receives, as inputs, the detected steering torque $T_{tb}$ detected by the torque sensor 11 and the estimated load torque $T_{load}$ computed by the vehicle model 54, and outputs the estimated motor angular velocity $\omega_{m,ref}$. The detected steering torque $T_{tb}$ detected by the torque sensor 11 and the estimated load torque $T_{load}$ computed by the vehicle model 54 serve as external torque, which is applied to the speed reducer 19 and which is other than the motor torque. That is, the torque sensor 11 is a first external torque specifying unit and the vehicle model 54 is a second external torque specifying unit. Details of the frictionless column-type EPS model 55 will be described later.

The angular velocity deviation computation unit 45 computes an angular velocity deviation $\Delta\omega_m = \omega_{m,ref} - \omega_{m,meas}$ between the estimated motor angular velocity $\omega_{m,ref}$ estimated by the motor angular velocity estimation unit 43 and the actual motor angular velocity $\omega_{m,meas}$ computed by the motor angular velocity computation unit 42. The PI control unit 46 is provided to improve robustness of friction compensation. The PI control unit 46 outputs a first assist torque correction value $T_{a,PI}$ by executing PI computation on the angular velocity deviation $\Delta\omega_m$ computed by the angular velocity deviation computation unit 45.

The basic assist torque command value computation unit 47 computes a basic assist torque command value $T_b$ on the basis of the vehicle speed V detected by the vehicle speed sensor 26 and the detected steering torque $T_{tb}$ detected by the torque sensor 11. The basic assist torque command value computation unit 47 corresponds to the basic motor torque command value computation unit in this invention. The first addition unit 48 computes a first assist torque command value $T_{ab}$ by adding together the basic assist torque command value $T_b$ computed by the basic assist torque command value computation unit 47 and the first assist torque correction value $T_{a,PI}$ computed by the PI control unit 46.

The detected steering torque $T_{tb}$ detected by the torque sensor 11, the estimated motor angular velocity $\omega_{m,ref}$ computed by the frictionless column-type EPS model 55, the estimated load torque $T_{load}$ computed by the vehicle model 54, and the first assist torque command value $T_{ab}$ are input into the friction compensation control unit 44. The friction compensation control unit will be also referred to as a friction controller. The friction compensation control unit 44 estimates a frictional force generated in the power column with the use of the above-described inputs and a control model 71 (described later), and outputs a second assist torque correction value $T_{a,FC}$ corresponding to the estimated frictional force. Details of the friction compensation control unit 44 will be described later. The second addition unit 49 computes a second assist torque command value $T_{abc}$ by adding the second assist torque correction value $T_{a,FC}$ computed by the friction compensation control unit 44 to the first assist torque command value $T_{ab}$ computed by the first addition unit 48.

The current command value computation unit 50 computes a current command value $I_m^*$ by dividing the assist torque command value $T_{abc}$ by a torque constant of the electric motor 18. The current deviation computation unit 51 computes a deviation $\Delta I_m = I_m^* - I_m$ between the current command value $I_m^*$ computed by the current command value computation unit 50 and an actual motor current $I_m$ detected by the current detecting circuit 33. The PI control unit 52 computes a voltage command value, which is a value of the voltage that should be applied to the electric motor 18, by executing PI computation on the current deviation $\Delta I_m$ computed by the current deviation computation unit 51.

The PWM control unit 53 produces a PWM signal with a duty ratio corresponding to the voltage command value computed by the PI control unit 52, and supplies the produced PWM signal to the motor driving circuit 31. The motor driving circuit 31 is an H-bridge circuit and includes multiple power elements. The multiple power elements are turned on and off on the basis of the PWM signals supplied from the PWM control unit, whereby a voltage corresponding to the voltage command value is applied to the electric motor 18.

The current deviation computation unit 51 and the PI control unit 52 constitute a current feedback controller. By the operation of the current feedback controller, the motor current passing through the electric motor 18 is controlled so as to approach the current command value $I_m^*$.

Figure 3:
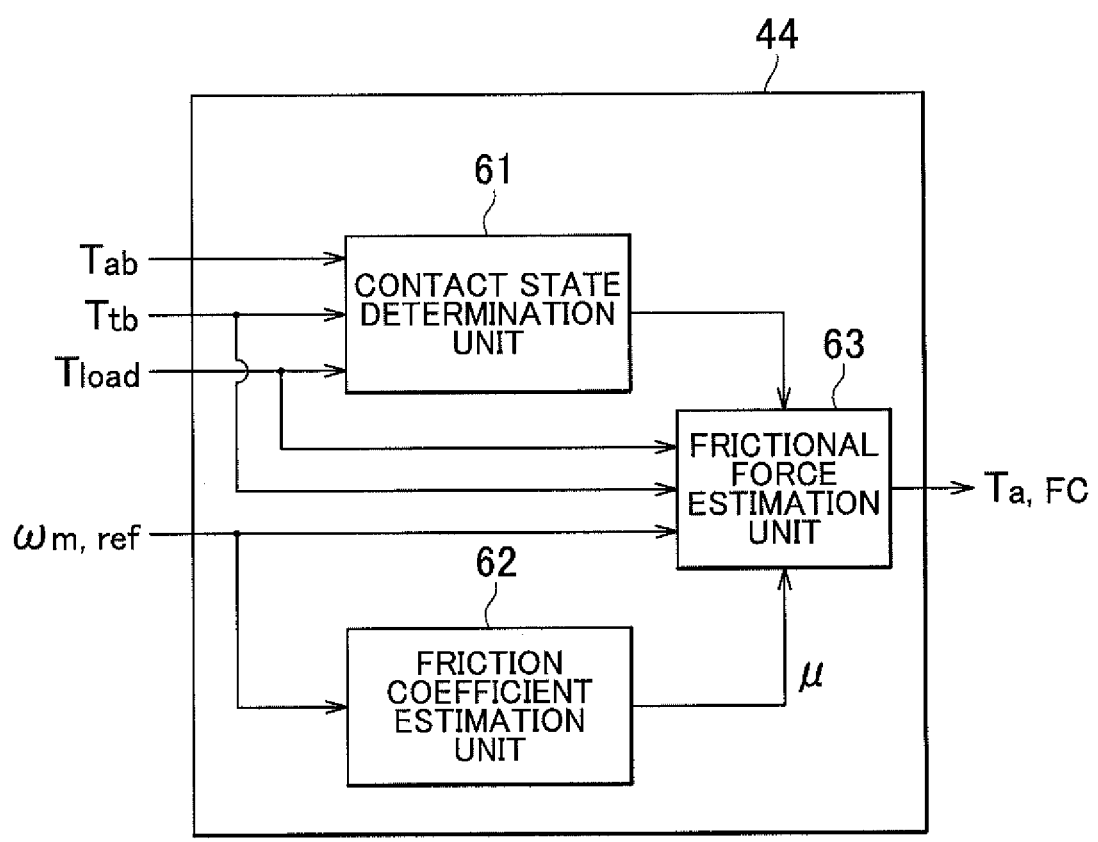
FIG. 3 is a block diagram illustrating the configuration of a friction compensation control unit.

Next, the friction compensation control unit 44 will be described with reference to FIG. 3 to FIG. 6. FIG. 3 is a block diagram illustrating the configuration of the friction compensation control unit 44. The friction compensation control unit 44 includes a contact state determination unit 61 that determines the contact state of the speed reducer 19, a friction coefficient estimation unit 62 that estimates a friction coefficient of the power column, and a frictional force estimation unit 63 that estimates a frictional force generated in the power column. As described above, the friction compensation control unit 44 estimates the frictional force generated in the power column with the use of a column-type EPS simulation model. The simulation model used in the friction compensation control unit 44 will be described below.

Figure 4:
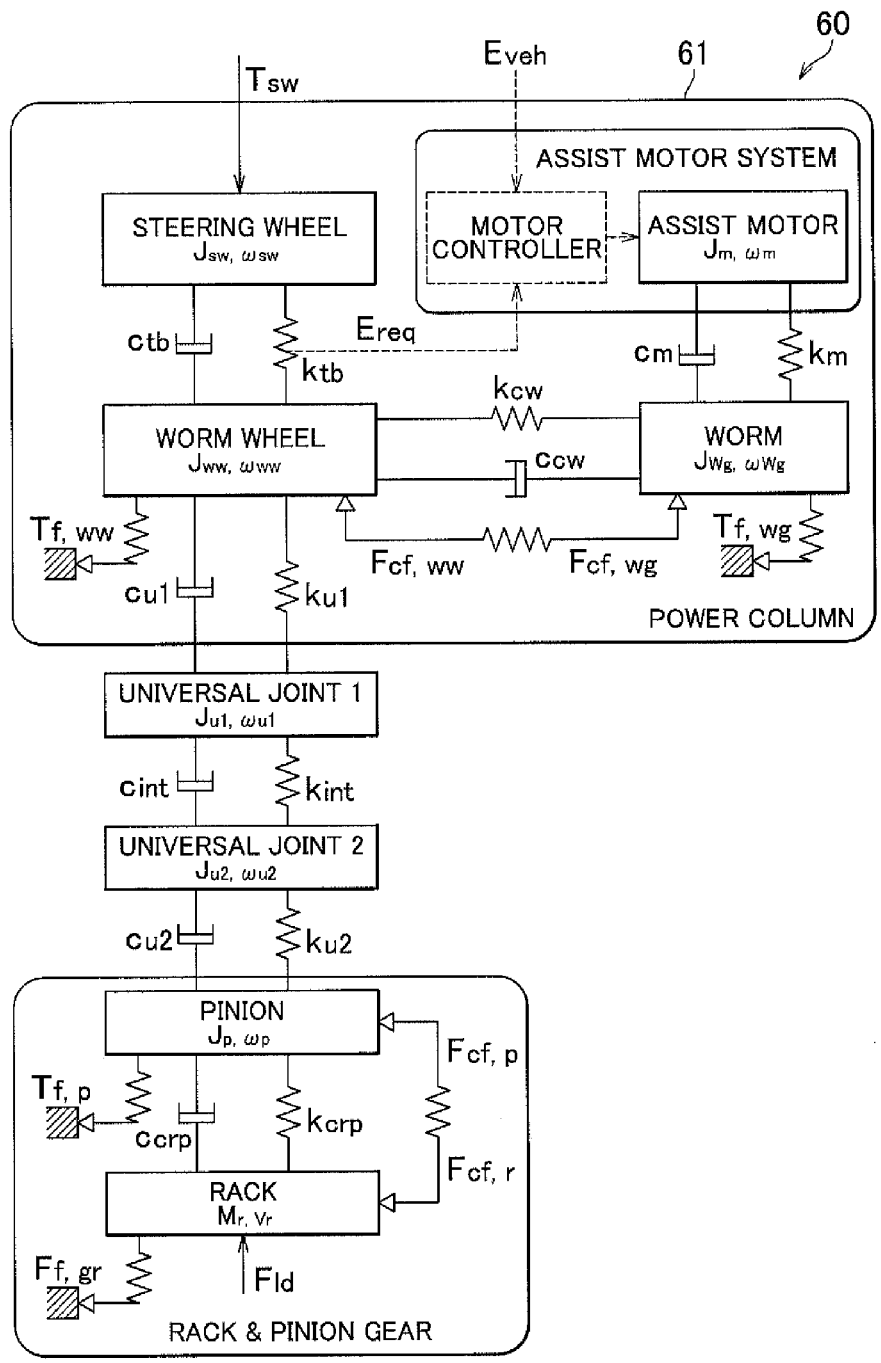
FIG. 4 is a schematic diagram illustrating the configuration of a typical column-type EPS simulation model.

FIG. 4 is a schematic diagram illustrating the configuration of a typical column-type EPS simulation model 60. The simulation model 60 is an eight-degree-of-freedom model. The inputs into the simulation model 60 include a steering wheel torque $T_{sw}$, a rack axial force $F_{1d}$, an input torque signal $E_{req}$, and a vehicle speed signal $E_{veh}$. The input torque signal $E_{req}$ corresponds to the torsion bar torque $T_{tb}$, and the vehicle speed signal $E_{veh}$ corresponds to the vehicle speed V.

The simulation model 60 includes a power column 61, an intermediate shaft, two universal joints, and a rack-and-pinion gear. The power column 61 includes a steering wheel, an assist motor system, a worm, and a worm wheel. The worm and the worm wheel constitute a speed reducer. The assist motor system includes an assist motor and a motor controller that controls the assist motor. The motor controller included in the simulation model 60 is a typical motor controller that does not have a friction compensation function. For example, the motor controller computes a current command value on the basis of the input torque signal $E_{req}$ and the vehicle speed signal $E_{veh}$, and executes feedback control such that the current passing through the assist motor becomes equal to the current command value. The rack-and-pinion gear includes a pinion and a rack.

In FIG. 4, J represents inertia, M represents a mass, ω represents an angular velocity or a velocity, k represents a stiffness coefficient, and c represents a viscosity coefficient. As the frictions, frictions $F_{cf,ww}$, $F_{cf,wg}$ of engagement portions of the speed reducer, frictions $F_{cf,p}$, $F_{cf,r}$ of engagement portions of the rack-and-pinion gear, frictions $T_{f,ww}$, $T_{f,wg}$, $T_{f,p}$ of bearings that support the worm, the worm wheel, and the pinion, and friction $F_{fgr}$ of a rack guide are taken into account. The meanings of the subscripts will be described below: sw represents the steering wheel; m represents the assist motor; ww represents the worm wheel; wg represents the worm; u1, u2 represents the universal joints; p represents the pinion gear; r represents the rack; tb represents the torsion bar; and int represents the intermediate shaft.

Figure 5:
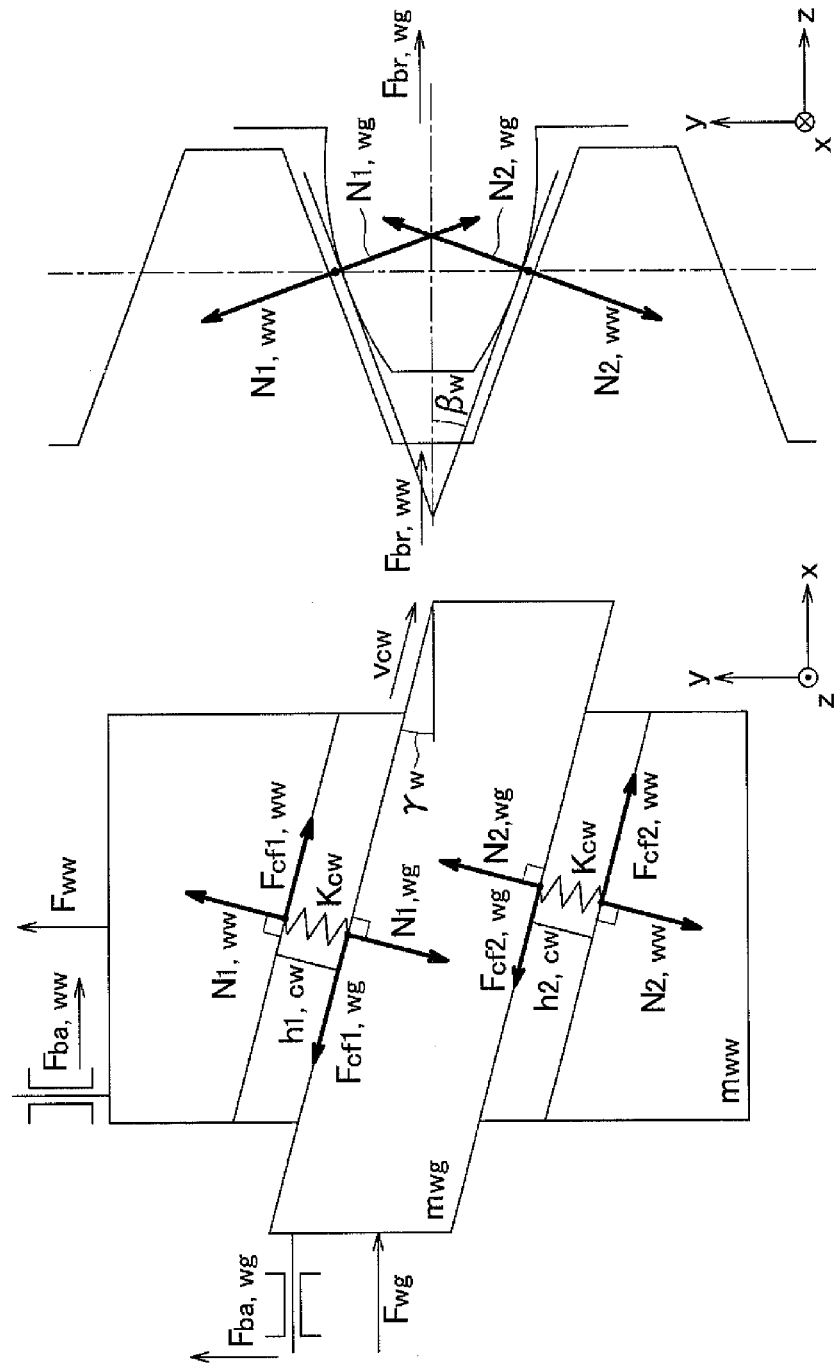
FIG. 5 is a schematic diagram illustrating a meshing model of a worm gear.

The power column 61 in the simulation model 60 illustrated in FIG. 4 will be described below in more detail. The speed reducer has a large frictional loss due to sliding at the engagement portions. Therefore, by employing a translational motion model in a pitch circle contact direction, regarding equivalent masses $m_{wg}$, $m_{ww}$ at the engaging contact portions of the worm and the worm wheel as illustrated in FIG. 5, the frictional loss that depends on an engaging force and a sliding velocity can be taken into account. The equivalent masses $m_{wg}$, $m_{ww}$ are calculated from gear inertias $J_{wg}$, $J_{ww}$. In the coordinate system, straight lines that coincide with tangent lines at the engagement point on the pitch circle, between the worm and the worm wheel are defined as an x-axis and a Y-axis. A straight line in which the rotation axes of the gears are the shortest is defined as a z-axis. In this model, the assumption is made that the worm moves on only the x-axis, and the worm wheel moves on only the Y-axis. Further, the assumption is made that the worm and the worm wheel engage with each other at only one tooth on the pitch circle. Further, the assumption is made that the number of contact points between the worm and the worm wheel is one or two. Furthermore, the assumption is made that an engaging pressure angle $\beta_w$ of the worm wheel is always constant. Moreover, the assumption is made that the frictional force of the tooth surface acts in the direction of a lead angle $\gamma_w$ of the worm wheel.

Equations of motion are expressed by Expressions (1), (2) from FIG. 5.

$$m_{wg}\vec{v}_{wg} = \vec{F}_{wg,tot} + \vec{N}_{1,wg} + \vec{N}_{2,wg} + \vec{F}_{cf1,wg} + \vec{F}_{cf2,wg} \quad (1)$$

$$m_{ww}\vec{v}_{ww} = \vec{F}_{ww,tot} + \vec{N}_{1,ww} + \vec{N}_{2,ww} + \vec{F}_{cf1,ww} + \vec{F}_{cf2,ww} \quad (2)$$

Here, $v_{wg}$ and $v_{ww}$ represent velocities of the worm and the worm wheel, respectively. The x component and the y component of the velocities $v_{wg}$, $v_{ww}$ of the worm and the worm wheel are expressed by products of the pitch circle radii $r_{wg}$, $r_{ww}$ and the angular velocities $\omega_{wg}$, $\omega_{ww}$ of the gears. $F_{wg,tot}$ represents the sum of an external force $F_{wg}$ that acts on the worm and the torque loss (which depends on a radial force $F_{br,wg}$ and an axial force $F_{ba,wg}$) due to the friction of the bearing that supports the worm. In the following description, the assumption is made that the torque loss is zero. $F_{ww,tot}$ represents the sum of an external force $F_{ww}$ that acts on the worm wheel and the torque loss due to the friction of the bearing that supports the worm wheel. The torque loss depends on a radial force $F_{br,ww}$ and an axial force $F_{ba,ww}$. In the following description, the assumption is made that the torque loss is zero.

A normal force $N_{i,j}$ of the tooth surface is expressed by Expression (3) with the use of a stiffness coefficient $k_{cw}$ and a viscosity coefficient $c_{cw}$ of the engagement point between the teeth.

$$N_{i,j} = k_{cw}(\Delta h_{i,cw} + h_{0,cw}) + c_{cw}\Delta \dot{h}_{i,cw} \; i=1,2 \; j=wg,ww \quad (3)$$

Here, a subscript i represents engagement points on the upper side and the lower side in FIG. 5, $h_{0,cw}$ represents an initial deflection due to an initial contact load, and $\Delta h_{i,cw}$ represents a fluctuation component of deflection and is expressed by Expression (4) with the use of displacements $x_{wg}$, $y_{wg}$ of the gears.

$$\Delta h_{i,cw} = \pm(x_{wg}\sin(\gamma_w) - y_{ww}\cos(\gamma_w)), \text{ where } i=1,2 \quad (4)$$

The frictional force $F_{cfi,j}$ of the tooth surface is expressed by Expressions (5), (6) with the use of a friction coefficient $\mu_{cw}$ that depends on the normal force and the sliding velocity $v_{cw}$.

$$F_{cfi,j} = \mu_{cw}(v_{cw})|N_{i,j}| \quad i=1,2 \ j=wg,ww \tag{5}$$

$$\vec{v}_{cw} = \vec{v}_{wg} - \vec{v}_{ww} \tag{6}$$

Figure 6:
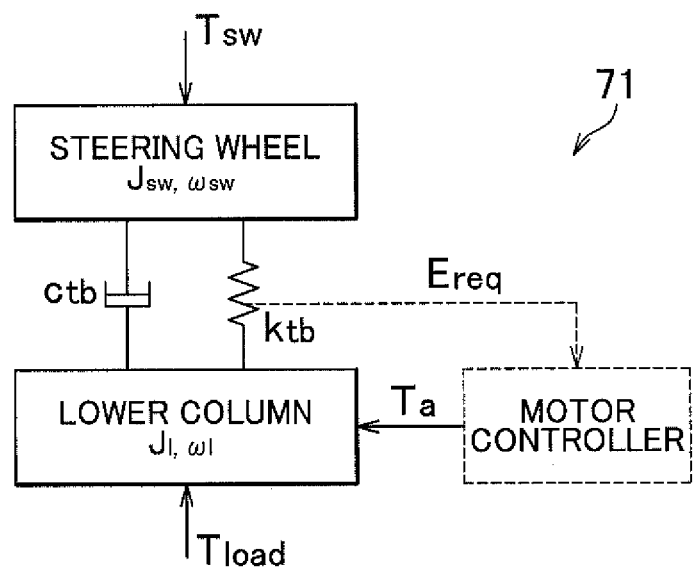
FIG. 6 is a schematic diagram illustrating the configuration a simulation model (control model) obtained by further simplifying the model of a power column in FIG. 4.

The friction coefficient can be obtained on the basis of a LuGre model (described later). In the present embodiment, the friction compensation control unit 44 estimates the friction in the power column, which is to be compensated for, with the use of a simulation model that is obtained by simplifying the model 61 of the power column illustrated in FIG. 4. Hereinafter, the simulation model obtained by simplifying the model 61 of the power column will be referred to as a control model 71. FIG. 6 is a schematic diagram illustrating the configuration of the control model 71. The model 61 of the power column illustrated in FIG. 4 is a four-degree-of-freedom model, whereas the control model 71 illustrated in FIG. 6 is a two-degree-of-freedom model.

In the control model 71, the assist motor, the worm and the worm wheel in the model 61 of the power column illustrated in FIG. 4 are integrated into a lower column. In FIG. 6, $J_1$ represents inertia of the lower column, and $\omega_1$ represents an angular velocity of the lower column.

An equation of motion regarding the steering wheel in the control model 71 and an equation of motion regarding the lower column (the worm and the worm wheel) are expressed by Expressions (7), (8), respectively.

$$J_{sw}\dot{\omega}_{sw} = T_{sw} - T_{tb} \tag{7}$$

$$(J_{ww} + (J_{wg} + J_m)i^2\eta)\dot{\omega}_1 = T_{tb} + T_{load} + T_a i\eta - \tau_0 \mu F_0 \frac{r_{ww}}{\sin(\gamma_w)\sin(\beta_w)} \tag{8}$$

Here, $J_{sw}$ represents inertia of the steering wheel. $d\omega_{sw}/dt$ represents an acceleration of the steering wheel. $T_{sw}$ represents a torque applied to the steering wheel. $T_{tb}$ represents a torsion bar torque, that is, a steering torque. $T_{load}$ represents a load torque transmitted from the rack to the lower column including the speed reducer. $T_a$ represents an assist torque applied to the work by the assist motor. $J_{ww}+(J_{wg}+J_m)i^2\eta$ in the left side of Expression (8) is inertia $J_1$ of the lower column. $J_{ww}$ represents inertia of the worm wheel, $J_{wg}$ represents inertia of the worm, and $J_m$ represents inertia of the assist motor. $d\omega_1/dt$ represents an acceleration of the lower column.

The worm is pressed against the worm wheel by a preload mechanism (not illustrated). $F_0$ represents a force with which the worm is pressed against the worm wheel by the preload mechanism, and will be referred to as a preload. The preload is applied to the worm in its radial direction. $\mu$ represents a friction coefficient of the power column, and includes a friction coefficient of the engagement portion of the worm gear, a friction coefficient between the worm and the bearing that supports the worm, and a friction coefficient between the worm wheel and the bearing that supports the worm wheel. $r_{ww}$ represents a pitch circle radius of the worm wheel. $\beta_w$ represents a pressure angle of the worm gear. $\gamma_w$ represents a lead angle of the worm gear. Here, i represents a gear ratio, that is, a reduction ratio, of the worm gear, and is defined as a ratio $\omega_{wg}/\omega_{ww}$ of the angular velocity of the worm to the angular velocity of the worm wheel. $\eta$ represents an efficiency of the worm gear.

The reduction ratio i and the efficiency $\eta$ of the worm gear are expressed by Expressions (9), (10), respectively.

$$i = \frac{r_{ww}}{r_{wg}} \frac{1}{\tan(\gamma_w)} \tag{9}$$

$$\eta = \tan(\gamma_w)\frac{\cos(\beta_w) - \tau_1 \mu \tan(\gamma_w)}{\cos(\beta_w)\tan(\gamma_w) + \tau_1 \mu} \tag{10}$$

Here, $r_{wg}$ represents a pitch circle radius of the worm. As can be apparently seen from Expressions (8), (10), the friction coefficient $\mu$ of the power column is included in an equation of motion regarding the worm wheel, and the forces that act on the worm wheel and the lower column are influenced by the friction generated in the power column. Because the worm is pressed against the worm wheel by the preload $F_0$, the state of contact between the worm and the worm wheel is classified into a single contact state in which the worm and the worm wheel contact each other at one point and a double contact state in which the worm and the worm wheel contact with each other at two points. Hereinafter, the state of contact between the worm and the worm wheel will be referred to as a contact state of the speed reducer. The contact state of the speed reducer changes depending on the magnitude of the torque transmitted to the speed reducer.

$\tau_0$ in Expression (8) and $\tau_1$ in Expression (10) are variables that vary depending on the contact state of the speed reducer. The values of the variables $\tau_0$, $\tau_1$ are determined on the basis of the initial contact force due to the preload $F_0$, that is, the contact force $N_0$ in the direction of a normal to the tooth surface, and a contact force variation $dN_c$. The contact force variation $dN_c$ can be calculated, for example, as follows.

The equations of motion expressed by Expressions (1), (2) can be expressed by Expressions (11), (12) with the use of Expression (3) and FIG. 5.

$$m_{wg}r_{wg}^2 \dot{\omega}_{wg} = r_{wg}F_{wg} + \\ \underline{r_{wg}\cos(\beta_w)\sin(\gamma_w)(-k_{cw}(\Delta h_{1,cw} + h_{0,cw}) + k_{cw}(\Delta h_{2,cw} + h_{0,cw}))} \times \\ \text{component of vector } N_{1,wg} + N_{2,wg} + \\ \underline{r_{wg}\mu\cos(\gamma_w)(-k_{cw}(\Delta h_{1,cw} + \Delta h_{0,cw}) - k_{cw}(\Delta h_{2,cw} + h_{0,cw}))} \times \\ \text{component of vector } F_{cf1,wg} + F_{cf2,wg} \tag{11}$$

$$m_{ww}r_{ww}^2 \dot{\omega}_{ww} = r_{ww}F_{ww} + \\ \underline{r_{ww}\cos(\beta_w)\cos(\gamma_w)(k_{cw}(\Delta h_{1,cw} + h_{0,cw}) - k_{cw}(\Delta h_{2,cw} + h_{0,cw}))} \\ y \text{ component of vector } N_{1,ww} + N_{2,ww} + \\ \underline{r_{ww}\mu\sin(\gamma_w)(-k_{cw}(\Delta h_{1,cw} + h_{0,cw}) - k_{cw}(\Delta h_{2,cw} + h_{0,cw}))} \\ y \text{ component of vector } F_{cf1,ww} + F_{cf2,ww} \tag{12}$$

Equations of motion (13), (14) in the rotation direction are obtained from Expressions (11), (12).

$$J_{wg}\dot{\omega}_{wg} = T_{wg} + r_{wg}\cos(\beta_w)\sin(\gamma_w)(-k_{cw}(\Delta h_{1,cw}+h_{0,cw})+ \\ k_{cw}(\Delta h_{2,cw}+h_{0,cw}))+r_{wg}\mu\cos(\gamma_w)(-\Delta k_{cw} \\ (\Delta h_{1,cw}+h_{0,cw})-k_{cw}(\Delta h_{2,cw}+h_{0,cw})) \tag{13}$$

$$J_{ww}\dot{\omega}_{ww} = T_{ww} + r_{ww}\cos(\beta_w)\cos(\gamma_w)(k_{cw}(\Delta h_{1,cw}+h_{0,cw})- \\ k_{cw}(\Delta h_{2,cw}+h_{0,cw}))+r_{ww}\mu\sin(\gamma_w)(-k_{cw}(\Delta h_{1,cw}+ \\ h_{0,cw})-k_{cw}(\Delta h_{2,cw}+h_{0,cw})) \tag{14}$$

$T_{wg}$ in Expression (13) represents a torque that acts on the worm. $T_{ww}$ in Expression (14) represents a torque that acts on the worm wheel. $T_{ww}=T_{tb}+T_{load}$ is established. Because the relationship $\Delta h_{2,cw}=-\Delta h_{1,cw}$ is established, the terms of a normal force in Expressions (13), (14) can be expressed by Expressions (15), (16), respectively.

$$\vec{N}_{1,wg} + \vec{N}_{2,wg} = k_{cw}(-(\Delta h_{1,cw} + h_{0,cw})^+ + (\Delta h_{2,cw} + h_{0,cw})^+)\cos(\beta_w)\sin(\gamma_w) \quad (15)$$
$$= -k_{cw}((h_{0,cw} + \Delta h_{1,cw})^+ - (h_{0,cw} - \Delta h_{1,cw})^+)\cos(\beta_w)\sin(\gamma_w)$$

$$\vec{N}_{1,ww} + \vec{N}_{2,ww} = k_{cw}((\Delta h_{1,cw} + h_{0,cw})^+ - (\Delta h_{2,cw} + h_{0,cw})^+)\cos(\beta_w)\sin(\gamma_w) \quad (16)$$
$$= k_{cw}((h_{0,cw} + \Delta h_{1,cw})^+ - (h_{0,cw} - \Delta h_{1,cw})^+)\cos(\beta_w)\sin(\gamma_w)$$

In Expressions (15), (16), notation $(A)^+$ indicates that $(A)^+ = A$ is established when $A \geq 0$, and $(A)^+ = 0$ is established when $(A) < 0$.

On the other hand, the terms of the frictional force in Expressions (13), (14) can be expressed by Expressions (17), (18), respectively.

$$\vec{F}_{cf1,wg} + \vec{F}_{cf2,wg} = k_{cw}(-(\Delta h_{1,cw} + h_{0,cw})^+ - (\Delta h_{2,cw} + h_{0,cw})^+)\mu\cos(\gamma_w) \quad (17)$$
$$= -k_{cw}((h_{0,cw} + \Delta h_{1,cw})^+ + (h_{0,cw} - \Delta h_{1,cw})^+)\mu\cos(\gamma_w)$$

$$\vec{F}_{cf1,ww} + \vec{F}_{cf2,ww} = k_{cw}(-(\Delta h_{1,cw} + h_{0,cw})^+ - (\Delta h_{2,cw} + h_{0,cw})^+)\mu\cos(\gamma_w) \quad (18)$$
$$= -k_{cw}((h_{0,cw} + \Delta h_{1,cw})^+ + (h_{0,cw} - \Delta h_{1,cw})^+)\mu\sin(\gamma_w)$$

When $k_{cw}((h_{0,cw}+\Delta h_{1,cw})^+ - (h_{0,cw}-\Delta h_{1,cw})^+)$ in Expressions (15), (16) is set as the contact force variation $dN_c$, and $k_{cw}((h_{0,cw}+\Delta h_{1,cw})^+ + (h_{0,cw}-\Delta h_{1,cw})^+)$ in Expressions (17), (18) is set as the normal force $dN_f$, the equations of motion (13), (14) in the rotation direction can be expressed by Expressions (19), (20), respectively.

$$J_{wg}\dot{\omega}_{wg} = T_{wg} - r_{wg}\cos(\beta_w)\sin(\gamma_w)dN_0 - r_{wg}\mu dN_f\cos(\gamma_w) \quad (19)$$

$$J_{ww}\dot{\omega}_{ww} = T_{tb} + T_{load} + r_{ww}\cos(\beta_w)\cos(\gamma_w)dN_c - r_{ww}\mu dN_f\sin(\gamma_w) \quad (20)$$

When $dN_f = 0$ is set and the relationship $\omega_{wg} = i \times \omega_{ww}$ is used, the contact force variation $dN_c$ can be calculated from Expressions (19), (20). At this time, the first assist torque command value $T_{ab}$ is used as $T_{wg}$. The steering torque $T_{tb}$ detected by the torque sensor 11 is used as the torsion bar torque $T_{tb}$. The load torque $T_{load}$ output from the vehicle model 54 is used as the load torque $T_{load}$. The basic assist torque command value $T_b$ may be used as $T_{wg}$.

The initial contact force $N_0$ can be calculated from $F_0/\sin\beta_w$. It is determined that the contact state is the double contact state when $N_0 - |dN_c| > 0$ is satisfied, whereas it is determined that the contact state is the single contact state when $N_0 - |dN_c| \leq 0$ is satisfied.

Table 1 shows conditions for discriminating the contact state of the speed reducer.

TABLE 1

Condition of the contact state

| Case | Condition | $\tau_0$ | $\tau_1$ | Contact state |
|---|---|---|---|---|
| (a) | $N_0 - |dN_c| > 0$ | 1 | 0 | Double contact |
| (b) | $N_0 - |dN_c| \leq 0$ and $dN_c \geq 0$ | 0 | 1 | Single contact (Positive worm torque) |
| (c) | $N_0 - |dN_c| \leq 0$ and $dN_c \leq 0$ | 0 | -1 | Single contact (Negative worm torque) |

When $N_0 - |dN_c| > 0$ is satisfied, it is determined that the contact state is the double contact state, the value of $\tau_0$ is 1, and the value of $\tau_1$ is 0. When $N_0 - |dN_c| \leq 0$ and $dN_c \geq 0$ are satisfied, it is determined that the contact state is the single contact state, the value of $\tau_0$ is 0, and the value of $\tau_1$ is 1. When $N_0 - |dN_c| \leq 0$ and $dN_c \leq 0$ are satisfied, it is determined that the contact state is the single contact state, the value of $\tau_0$ is 0, and the value of $\tau_1$ is $-1$. The contact state determination unit 61 illustrated in FIG. 3 determines the contact state of the speed reducer as described above, and supplies the determination result and the value of $\tau_1$ corresponding to the determination result to the frictional force estimation unit 63.

When the assumption is made that friction is not generated in the control model 71 illustrated in FIG. 6 and the assist torque $T_a$ is zero, the equation of motion of Expression (8) is expressed by Expression (21). Hereinafter, Expression (21) will be referred to as an equation of motion (21) in the case where the assumption is made that friction is not generated.

$$[J_{ww} + (J_{wg} + J_m)i^2]\dot{\omega}_1 = T_{tb} + T_{load} \quad (21)$$

When friction is not generated in the control model 71, $\mu$ in Expressions (8), (10) is 0. Therefore, $\eta$ is 1. Expression (21) can be induced by setting $\eta$ in Expression (8) to 1 and setting $T_a$ and $\mu$ in Expression (8) to 0. Expression (8) is an equation of motion in the case where the friction in the power column is taken into account, whereas Expression (21) is an equation of motion in the case where the assumption is made that friction is not generated in the power column. The frictional force estimation unit 63 illustrated in FIG. 3 estimates the frictional force generated in the power column on the basis of both the equations of motion (8), (21), and computes the assist torque for cancelling out the estimated frictional force, as the second assist torque correction value $T_{a,FC}$.

The method of computing the second assist torque correction value $T_{a,FC}$ as a method of estimating a frictional force varies depending on the contact state of the speed reducer. First, the method of computing the second assist torque correction value $T_{a,FC}$ when the contact state of the speed reducer is the double contact state will be described. In the control model 71 illustrated in FIG. 6, $\tau_0 = 1$ and $\tau_1 = 0$ are established as shown in Table 1 when the magnitude of the torque transmitted to the speed reducer is small and the contact state of the speed reducer is the double contact state.

Therefore, the equation of motion regarding the worm wheel in the case where the contact state of the speed reducer is the double contact state is expressed by Expression (22) by substituting $\tau_0 = 1$ and $\tau_1 = 0$ into Expression (8).

$$(J_{ww} + (J_{wg} + J_m)i^2)\dot{\omega}_1 = T_{tb} + T_{load} + T_a i - \mu F_0 \frac{r_{ww}}{\sin(\gamma_w)\sin(\beta_w)} \quad (22)$$

When the term $[T_a i - \mu F_0 \{r_{ww}/\sin(\gamma_w)\sin(\beta_w)\}]$ in the right side of Expression (22) can be brought to be zero, the equation of motion (21) in the case where the assumption is made that there is no friction is established. Therefore, the frictional force estimation unit 63 (see FIG. 3) computes the assist torque $T_a$ at which the term $[T_a i - \mu F_0 \{r_{ww}/\sin(\gamma_w)\sin(\beta_w)\}]$ is zero, as the second assist torque correction value $T_{a,FC}$. In other words, the fourth term $-\mu F_0 \{r_{ww}/\sin(\gamma_w)\sin(\beta_w)\}$ in the right side of Expression (22) represents a frictional force generated in the power column when the contact state of the speed reducer is the double contact state. Therefore, the frictional force estimation unit 63 computes the assist torque $T_a$ for cancelling out the frictional force, as the second assist torque correction value $T_{a,FC}$.

The expression for computing the second assist torque correction value $T_{a,FC}$ when the contact state of the speed reducer is the double contact state is expressed by Expression (23).

$$T_{a,FC} = \frac{1}{i} \frac{F_0 r_{ww}}{\sin(\gamma_w)\sin(\beta_w)} \mu \quad (23)$$

Here, the friction coefficient $\mu$ estimated by the friction coefficient estimation unit 62 (described later) is used as the friction coefficient $\mu$.

The method of computing the second assist torque correction value $T_{a,FC}$ when the contact state of the speed reducer is the single contact state will be described. In the control model 71 illustrated in FIG. 6, when the contact state of the speed reducer is the single contact state (when the magnitude of the torque transmitted to the speed reducer is large), $\tau_0 = 0$ and, $\tau_1 = 1$ or $\tau_1 = -1$ are established as shown in Table 1.

Therefore, the equation of motion regarding the worm wheel in the case where the contact state of the speed reducer is the single contact state is expressed by Expression (24) by substituting $\tau_0 = 0$ into Expression (8).

$$\left(\frac{J_{ww}}{\eta} + (J_{wg} + J_m)i^2\right)\dot{\omega}_1 = \frac{T_{tb} + T_{load}}{\eta} + T_a i \quad (24)$$

The form of the equation of motion (21) in the case where the assumption is made that there is no friction is modified as shown in Expression (21a) so as to correspond to the form of Expression (24).

$$\left(\frac{J_{ww}}{\eta} + \Delta x_1 + (J_{wg} + J_m)i^2\right)\dot{\omega}_1 = \frac{T_{tb} + T_{load}}{\eta} + \Delta x_2 \quad (21a)$$

$$\Delta x_1 = J_{ww}\left(1 - \frac{1}{\eta}\right)$$

$$\Delta x_2 = (T_{tb} + T_{load})\left(1 - \frac{1}{\eta}\right)$$

When the term $\Delta x_1$ in the left side of Expression (21a) is transposed to the right side, Expression (21b) is obtained.

$$\left(\frac{J_{ww}}{\eta} + (J_{wg} + J_m)i^2\right)\dot{\omega}_1 = \frac{T_{tb} + T_{load}}{\eta} - \Delta x_1 \dot{\omega}_1 + \Delta x_2 \quad (21b)$$

When the second term $T_a i$ in the right side of Expression (24) is equal to the term $(\Delta x_1 \cdot d\omega_1/dt + \Delta x_2)$ in the right side of Expression (21a), the equation of motion (21b) in the case where the assumption is made that there is no friction is established. Therefore, the frictional force estimation unit 63 computes the assist torque $T_a$ at which $T_a i = -\Delta x_1 \cdot d\omega_1/dt + \Delta x$ is established, as the second assist torque correction value $T_{a,FC}$. In other words, the term $(\Delta x_1 \cdot d\omega_1/dt + \Delta x_2)$ obtained by inverting the sign of the term $(-\Delta x_1 \cdot d\omega_1/dt + \Delta x_2)$ in the right side of Expression (21b) represents a frictional force generated in the power column when the contact state of the speed reducer is the single contact state. Therefore, the frictional force estimation unit 63 computes the assist torque $T_a$ for cancelling out the frictional force, as the second assist torque correction value $T_{a,FC}$.

The expression for computing the second assist torque correction value $T_{a,FC}$ when the contact state of the speed reducer is the single contact state is expressed by Expression (25).

$$T_{a,FC} = \frac{1}{i}(-\Delta x_1 \dot{\omega}_1 + \Delta x_2) \quad (25)$$

Here, the efficiency $\eta$ estimated from the friction coefficient $\mu$ estimated by the friction coefficient estimation unit 62 and Expression (10) is used as the efficiency $\eta$. The angular velocity $\omega_1$ of the lower column is calculated as a product $(\omega_{m,ref} i)$ of the estimated motor angular velocity $\omega_{m,ref}$ estimated by the motor angular velocity estimation unit 43 and the gear ratio i. The angular acceleration $d\omega_1/dt$ of the lower column is calculated from the angular velocity $\omega_1$ of the lower column. The steering torque $T_{tb}$ detected by the torque sensor 11 is used as the torsion bar torque $T_{tb}$. The load torque $T_{load}$ output from the vehicle model 54 is used as the load torque $T_{load}$.

That is, when it is determined that the contact state of the speed reducer is the double contact state, the frictional force estimation unit 63 computes the second assist torque correction value $T_{a,FC}$ on the basis of Expression (23). On the other hand, when it is determined that the contact state of the speed reducer is the single contact state, the frictional force estimation unit 63 computes the second assist torque correction value $T_{a,FC}$ on the basis of Expression (25).

The friction coefficient estimation unit 62 will be described below. The friction coefficient estimation unit 62 estimates the friction coefficient of the power column with the use of a LuGre model. The friction coefficient $\mu$ based on the LuGre model is expressed by Expression (26) with the use of the sliding velocity $v_s$ between two objects and the deflection p of the brush.

$$\mu = \sigma_0 p + \sigma_1 \dot{p} + \sigma_2 v_s \quad (26)$$

$$\dot{p} = v_s - \sigma_0 \frac{|v_s|}{g(v_s)} p$$

$$g(v_s) = \mu_o + (\mu_{ba} - \mu_o)e^A$$

$$A = -(|v_s|/v_{sb})^2$$

Here, $\mu_c$ represents a coulomb friction coefficient. $\mu_{ba}$ represents a maximum friction coefficient. $v_{sb}$ represents a sliding velocity at which a Stribeck effect is exhibited. $\sigma_0$ represents a stiffness coefficient of the brush. $\sigma_1$ represents an attenuation coefficient of the brush. $\sigma_2$ represents a viscous friction coefficient. These six parameters are empirically obtained.

The sliding velocity $v_s$ that is an input into the LuGre model is computed on the basis of Expression (27).

$$v_s = r_{wg} \cdot \omega_{m,ref}/\cos(\gamma_m) \tag{27}$$

That is, the friction coefficient estimation unit 62 estimates the friction coefficient $\mu$ of the power column with the use of the estimated motor angular velocity $\omega_{m,ref}$ estimated by the motor angular velocity estimation unit 43 and the LuGre model expressed by Expression (26).

A model obtained by excluding the frictions $F_{cf,ww}$, $F_{cf,wg}$, $T_{f,ww}$, $T_{f,wg}$ in the power column, from the typical column-type EPS simulation model 60 illustrated in FIG. 4 is used as the frictionless column-type EPS model 55. The frictionless column-type EPS model 55 may be a model obtained by excluding the frictions $F_{cf,ww}$, $F_{cf,wg}$, $T_{f,ww}$, $T_{f,wg}$ in the power column, from the control model 71 illustrated in FIG. 6. In this case, the frictionless column-type EPS model 55 computes the estimated motor angular velocity $\omega_{m,ref}$ as follows. That is, the frictionless column-type EPS model 55 calculates the acceleration $d\omega_1/dt$ of the lower column with the use of the steering torque $T_{tb}$ detected by the torque sensor 11, the estimated load torque $T_{load}$ output from the vehicle model 54, and the equation of motion (21) in the case where the assumption is made that there is no friction. Then, the frictionless column-type EPS model 55 computes the angular velocity $\omega_1$ of the lower column from the calculated acceleration $d\omega_1/dt$. Then, the frictionless column-type EPS model 55 computes the estimated motor angular velocity $\omega_{m,ref}$ by dividing the angular velocity $\omega_1$ of the lower column by the gear ratio i.

In the first embodiment, the friction compensation control unit 44 estimates the friction generated in the speed reducer 19 on the basis of the control model 71 in which the friction generated in the speed reducer 19 is taken into account and the load torque $T_{load}$ applied to the speed reducer 19 is included as an input. Accordingly, in the first embodiment, the friction that depends on the load transmitted to the speed reducer 19 can be taken into account. In the first embodiment, because the friction compensation control unit 44 estimates the friction generated in the speed reducer 19 with the use of the friction coefficient $\mu$ that depends on the sliding velocity $v_s$ of the speed reducer 19, it is possible to compensate for the variation of the friction coefficient that depends on the sliding velocity $v_s$ of the speed reducer 19.

Figure 7:
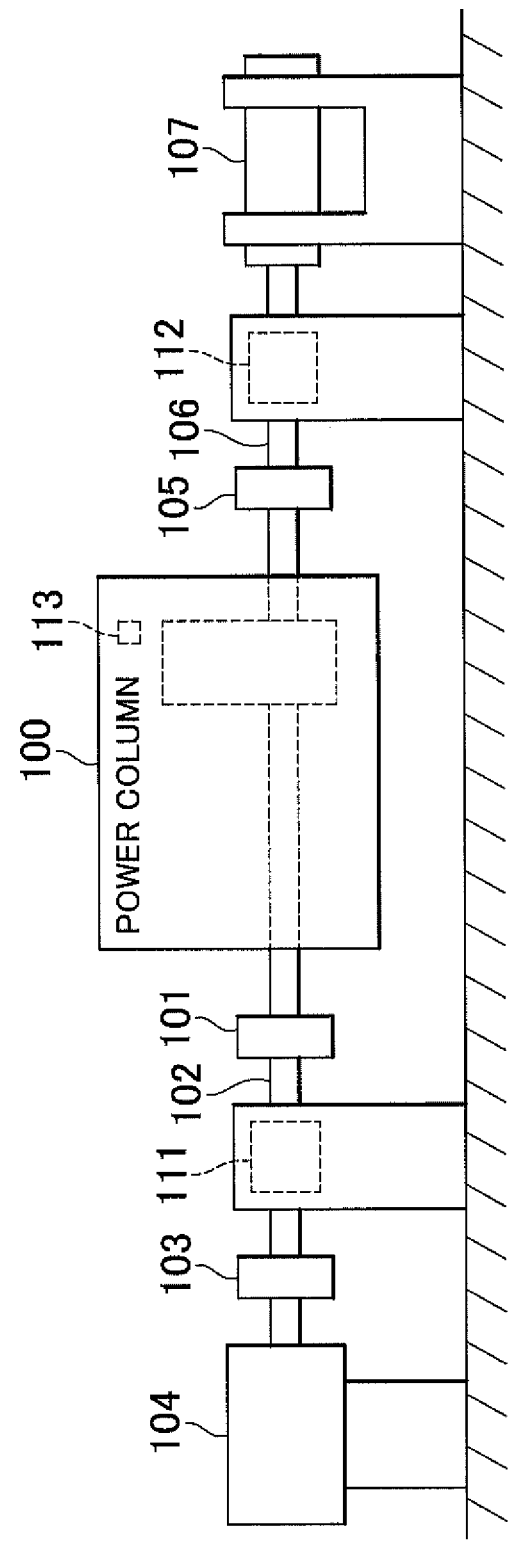
FIG. 7 is a diagram schematically illustrating the configuration of an experiment device.

The effect of the friction compensation in the first embodiment is verified with the use of a power column test bench. FIG. 7 is a schematic diagram illustrating the configuration of an experiment device. An input shaft of a power column 100 is connected to a first rotary shaft 102 via a shaft coupling 101. An output shaft of a servo-motor 104 that supplies input torque to the power column 100 is connected to the first rotary shaft 102 via a shaft coupling 103. A first torque sensor 111 that detects a torque to be input into the power column 100 is disposed around the first rotary shaft 102.

An output shaft of the power column 100 is connected to a second rotary shaft 106 via a shaft coupling 105. Instead of actual rack load, a load is applied to the second rotary shaft 106 by a torsion spring 107. The torsion spring constant of the torsion spring 107 is 0.6 Nm/rad in this example. A second torque sensor 112 that detects a torque output from the power column 100 is disposed around the second rotary shaft 106. The power column 100 is provided with a rotation angle sensor 113 that detects a rotation angle of an assist motor (electric motor 18). A sinusoidal input torque with a small amplitude (1 Nm in this example) and a low frequency (0.1 Hz in this example) is applied to the power column 100 by the servo-motor 104.

Figure 8A:
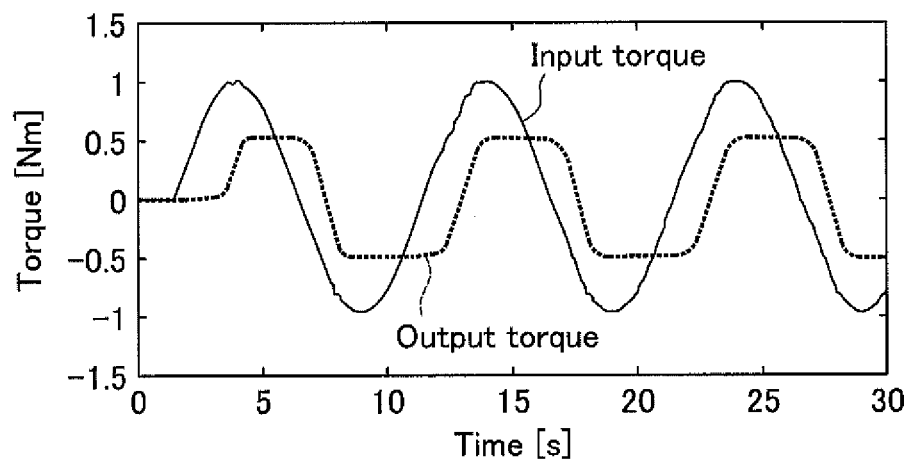
FIG. 8A is a time chart showing variations of the input torque and the output torque.
Figure 8B:
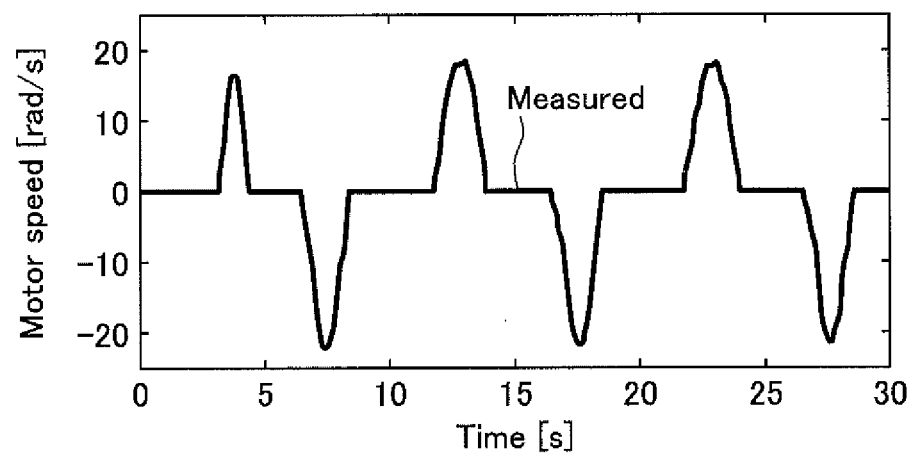
FIG. 8B is a time chart showing variations of the angular velocity of an assist motor.

FIGS. 8A and 8B illustrate an experimental result of the open-loop performance of the power column, that is, an experimental result obtained when the friction compensation according to the present embodiment is not executed. FIG. 8A shows variations of the input torque and the output torque, and FIG. 8B shows a variation of the angular velocity of the assist motor. As shown in FIG. 8A, when the sign of the gradient of the input torque changes, nonlinearity of the output torque response is observed at the change point of the sign. As a result, as shown in FIG. 8B, discontinuity in the angular velocity of the assist motor is observed.

Figure 9A:
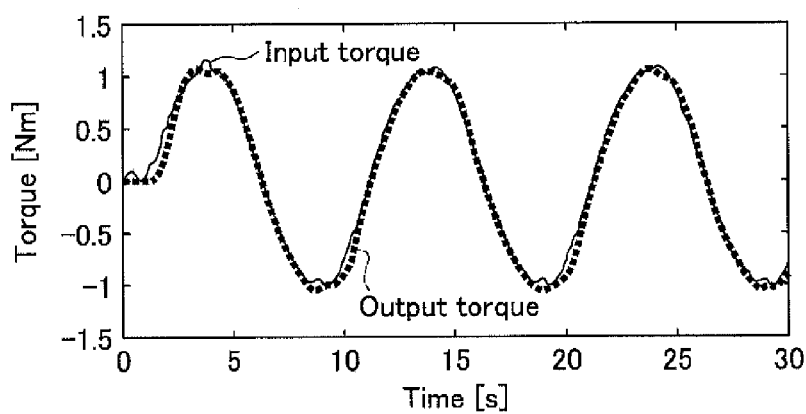
FIG. 9A is a time chart showing variations of the input torque and the output torque.
Figure 9B:
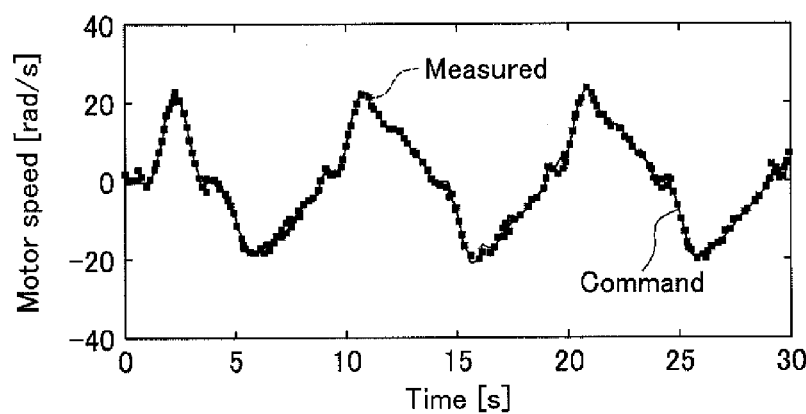
FIG. 9B is a time chart showing variations of the angular velocity of the assist motor.
Figure 9C:
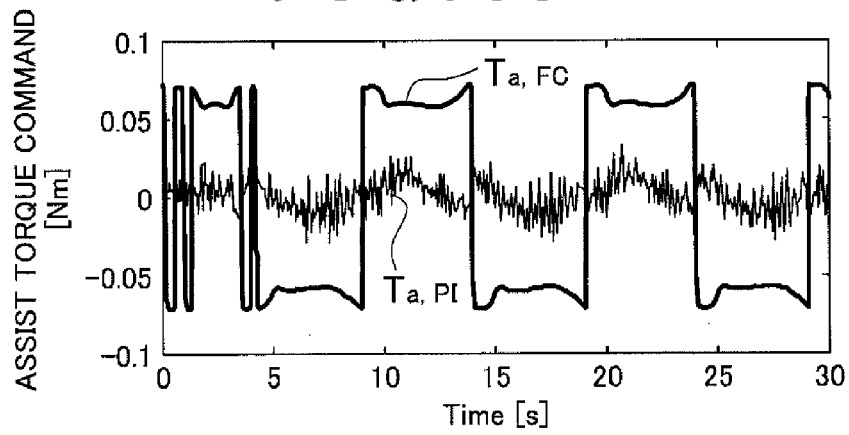
FIG. 9C is a time chart showing variations of a first assist torque correction value $T_{a,\,FC}$ and a second assist torque correction value $T_{a,PI}$.

FIGS. 9A, 9B, and 9C show experimental results obtained when the friction compensation according to the present embodiment is executed. FIG. 9A shows variations of the input torque and the output torque, FIG. 9B shows a variation of the angular velocity of the assist motor, and FIG. 9C shows variations of the second assist torque correction value $T_{a,FC}$ and the first assist torque correction value $T_{a,PI}$.

It can be understood from FIG. 9A that nonlinearity of the output torque is eliminated. It can be understood from FIG. 9B that the actually-measured angular velocity of the assist motor follows the estimated motor angular velocity. It can be understood from FIG. 9C that the advantageous effect due to the compensation term of the friction compensation control unit 44 is larger than the advantageous effect due to the PI control unit 46.

Figure 10:
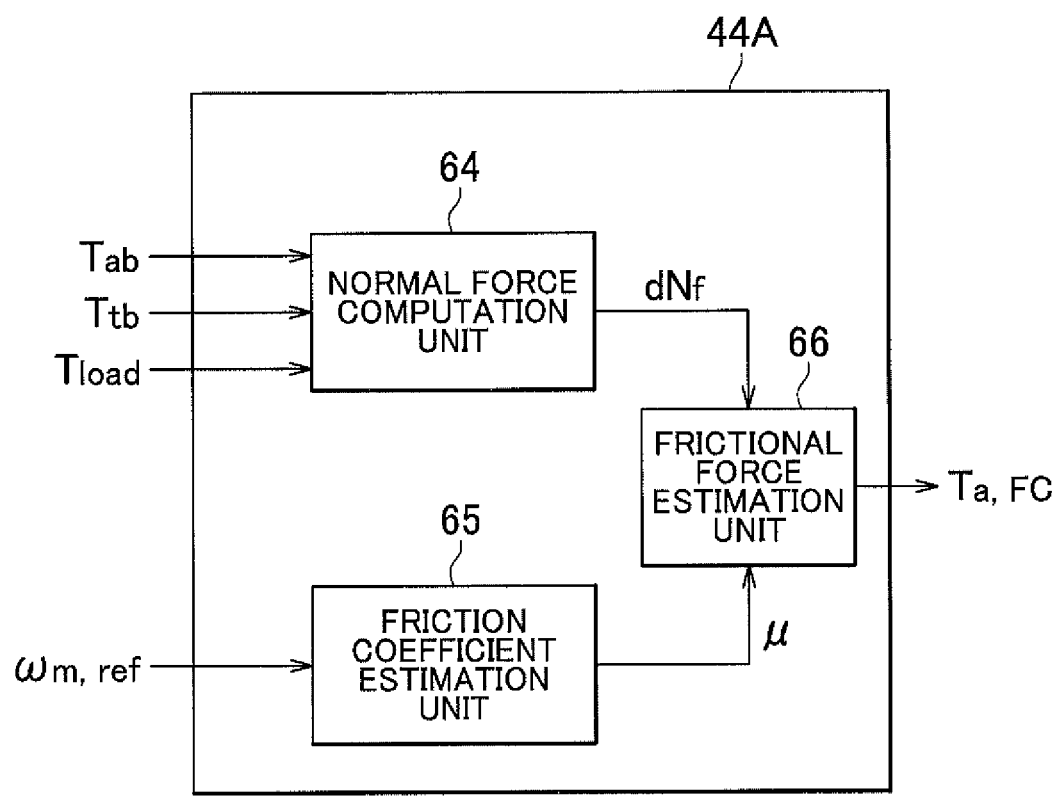
FIG. 10 is a block diagram illustrating an example of the configuration of another friction compensation control unit.

While the first embodiment of the invention has been described, the invention may be implemented in various other embodiments. For example, the friction compensation control unit 44 may be replaced with a friction compensation control unit 44A as illustrated in FIG. 10. FIG. 10 is a block diagram illustrating the configuration of the friction compensation control unit 44A, which is another example of a friction compensation control unit. The friction compensation control unit 44A includes a normal force computation unit 64, a friction coefficient estimation unit 65, and a frictional force estimation unit 66. The operation of the friction coefficient estimation unit 65 is the same as the operation of the friction coefficient estimation unit 62 illustrated in FIG. 3, and therefore description thereof will be omitted.

The normal force computation unit 64 and the frictional force estimation unit 66 will be described below. As described above, Expressions (19), (20) are expressions obtained by simplifying the equations of motion (13), (14) in the rotation direction with the use of the contact force variation $dN_c$ and the normal force $dN_f$.

$$J_{wg}\dot{\omega}_{wg} = T_{wg} - r_{wg}\cos(\beta_w)\sin(\gamma_w)dN_0 - r_{wg}\mu dN_f \cos(\gamma_w) \tag{19}$$

$$J_{ww}\dot{\omega}_{ww} = T_{tb} + T_{load} + r_{ww}\cos(\beta_w)\cos(\gamma_w)dN_c - r_{ww}\mu dN_f \sin(\gamma_w) \tag{20}$$

With the use of the relationship $\omega_{wg} = i \times \omega_{ww}$, by erasing $dN_f$ in Expressions (19), (20), an equation of motion (28) is obtained.

$$(J_{ww} + J_{wg}i^2)\dot{\omega}_{ww} = T_{tb} + T_{load} + iT_{wg} - \mu dN_f \frac{r_{ww}}{\sin(\gamma_w)} \tag{28}$$

Because the fourth term in the right side of the equation of motion (28) represents a frictional torque generated in the lower column, the torque ($\mu dN_f r_{ww}/\sin(\gamma_w)$) for compensating for the frictional torque is added, as the second assist torque correction value $T_{a,FC}$, to the first assist torque command value $T_{ab}$.

The normal force computation unit 64 calculates the contact force variation $dN_c$ from Expressions (19), (20) by setting $dN_f$ in Expressions (19), (20) to 0, with the use of the relationship $\omega_{wg}=i\times\omega_{ww}$. At this time, the first assist torque command value $T_{ab}$ is used as $T_{wg}$. The steering torque $T_{tb}$ detected by the torque sensor 11 is used as the torsion bar torque $T_{tb}$. The load torque $T_{load}$ output from the vehicle model 54 is used as the load torque $T_{load}$. The basic assist torque command value $T_b$ may be used as $T_{wg}$.

The normal force computation unit 64 calculates the initial contact force $N_0$ on the basis of $N_0=F_0/\sin\beta_w$. When $N_0-|dN_c|>0$ is satisfied, the contact state is the double contact state. When $N_0-|dN_c|\le 0$ is satisfied, the contact state is the single contact state. The normal force computation unit 64 computes the normal force $dN_f$ on the basis of Expression (29).

$$dN_f=\max(|dN_c|,N_0) \qquad (29)$$

That is, the normal force $dN_f$ is set to the larger value of $|dN_c|$ and $N_0$. The frictional force $F_{fric,comp}$ is expressed by Expression (30).

$$F_{fric,comp}=\mu dN_f \qquad (30)$$

The friction coefficient estimation unit 65 computes the second assist torque correction value $T_{a,FC}$ on the basis of Expression (31).

$$T_{a,FC}=\mu dN_f r_{ww}/\sin(\gamma_w) \qquad (31)$$

When the friction compensation control unit 44A is used, the friction that depends on the load transmitted to the speed reducer 19 can be taken into account and the variation of the friction coefficient that depends on the sliding velocity $v_s$ of the speed reducer 19 can be compensated for.

In the first embodiment, the vehicle model 54 is the two-wheeled vehicle model, but the vehicle model 54 may be a vehicle model other than the two-wheeled vehicle model. Similarly, the frictionless column-type EPS model 55 may be a model other than the above-mentioned two types of models. Similarly, the control model 71 may be a model other than the model illustrated in FIG. 6, as long as the model is a model in which the friction of the speed reducer out of the friction in the column-type EPS is taken into account and the load torque to be applied to the speed reducer is input into the model.

In the first embodiment, the second assist torque command value $T_{abc}$ is computed by adding the second assist torque correction value $T_{a,FC}$ to the first assist torque command value $T_{ab}$ that is obtained by adding the first assist torque correction value $T_{a,PI}$ to the basic assist torque command value $T_b$. Alternatively, the second assist torque command value $T_{abc}$ may be computed by adding the second assist torque correction value $T_{a,FC}$ to the basic assist torque command value $T_b$. In this case, the basic assist torque command value $T_b$ instead of the first assist torque command value $T_{ab}$ is input into the friction compensation control units 44, 44A. By employing this method, the angular velocity deviation computation unit 45, the PI control unit 46, and the first addition unit 48 may be omitted.

A second embodiment of the invention will be described below with reference to FIG. 11 to FIG. 13. In the second embodiment as well, the schematic configuration of the column-type EPS illustrated in FIG. 1 is the same as that in the first embodiment. The second embodiment is different from the first embodiment in the configuration of the ECU.

Figure 11:
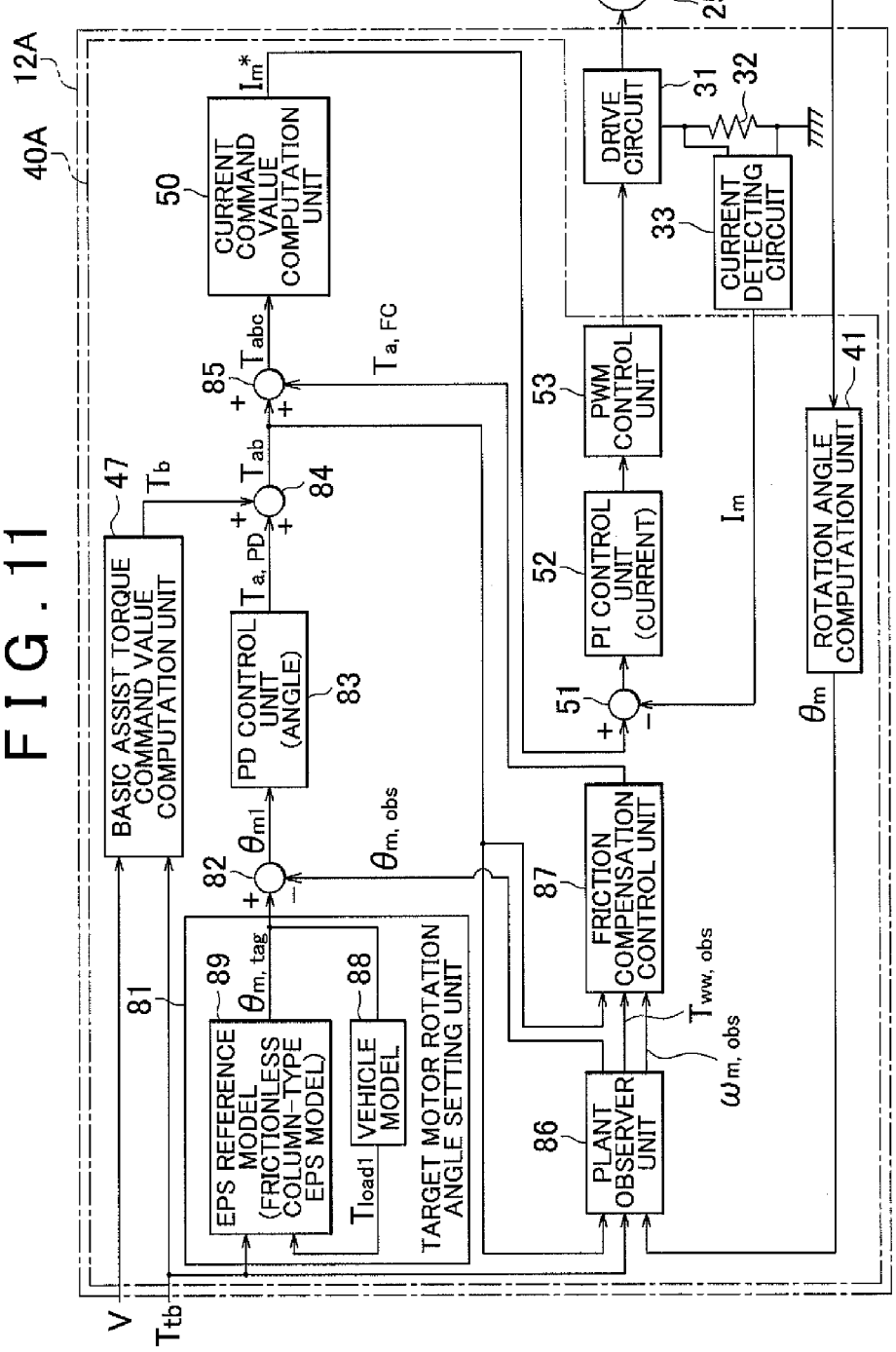
FIG. 11 is a schematic diagram illustrating the electrical configuration of an ECU in a second embodiment of the invention.
Figure 12:
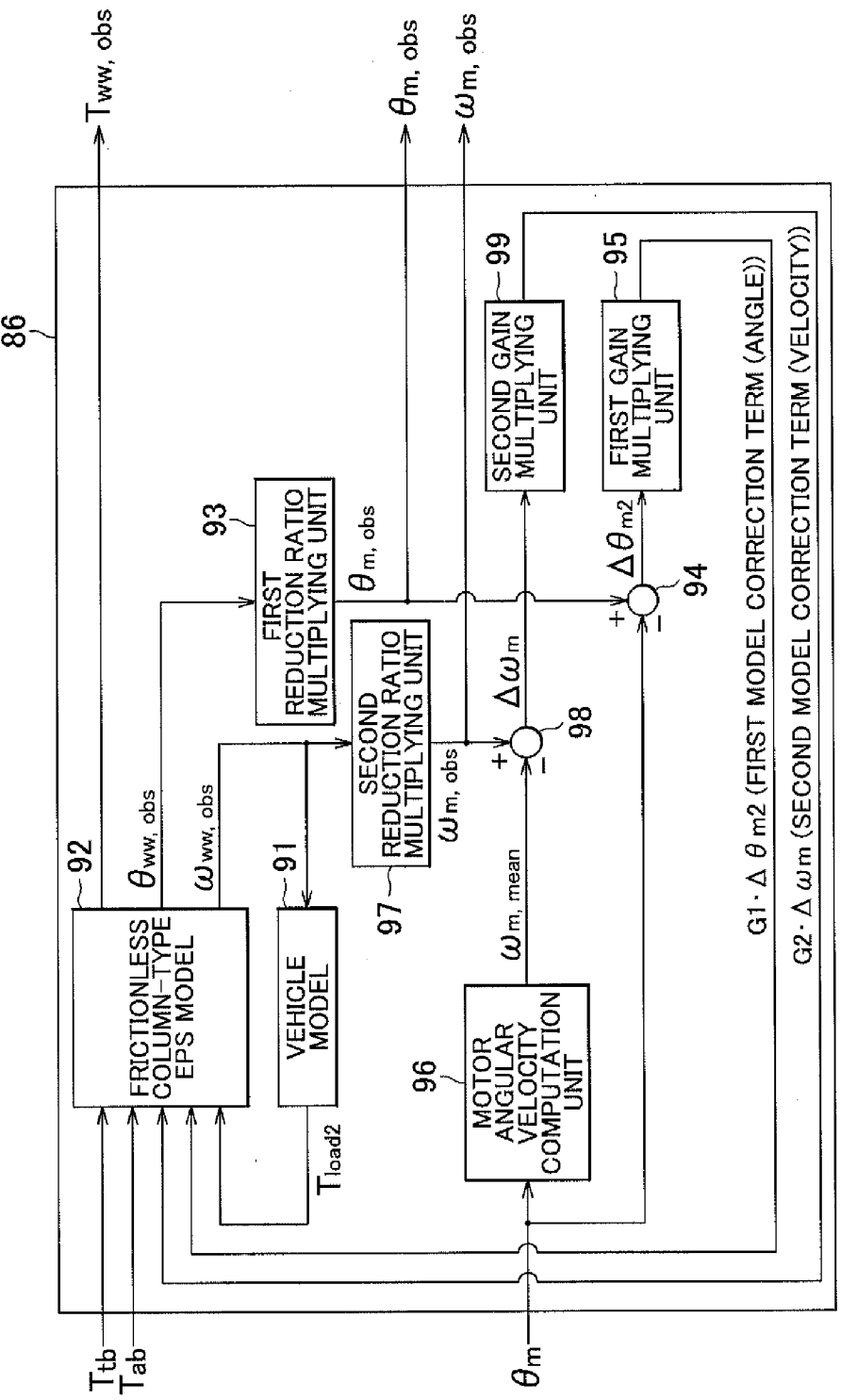
FIG. 12 is a block diagram illustrating the configuration of a plant observer unit.

FIG. 11 is a schematic diagram illustrating the electrical configuration of an ECU 12A in the second embodiment. In FIG. 11, elements corresponding to the elements illustrated in FIG. 2 will be denoted by the same reference numerals as those in FIG. 2.

The ECU 12A realizes steering assist suitable for steering conditions by driving the electric motor 18 on the basis of the detected steering torque $T_{tb}$ detected by the torque sensor 11 illustrated in FIG. 1, the vehicle speed V detected by the vehicle speed sensor 26 illustrated in FIG. 1, and the rotation angle $\theta_m$ of the electric motor 18 computed on the basis of the output from the rotation angle sensor 25. The ECU 12A realizes friction compensation for reducing the influence of friction in the power column by controlling driving of the electric motor 18. In the present embodiment, the electric motor 18 is a DC motor with a brush.

The ECU 12A includes a microcomputer 40A, a drive circuit 31 that is controlled by the microcomputer 40A and that supplies electric power to the electric motor 18, and a current sensing resistor 32 and a current detecting circuit 33 that are used to detect a current passing through the electric motor 18. Hereinafter, the current passing through the electric motor 18 will be referred to as a motor current. The microcomputer 40A includes a CPU and memories, and serves as multiple functional processing units by executing predetermined programs. The memories include a ROM, a RAM, a nonvolatile memory, and the like. The multiple functional processing units include a rotation angle computation unit 41, a target motor rotation angle setting unit 81, an angle deviation computation unit 82, a PD control unit 83, a basic assist torque command value computation unit 47, a first addition unit 84, a second addition unit 85, a plant observer unit 86, a friction compensation control unit 87, a current command value computation unit 50, a current deviation computation unit 51, a PI control unit 52, and a PWM control unit 53. PD is an abbreviation for proportional differential, PI is an abbreviation for proportional integral, and PWM is an abbreviation for pulse width modulation.

The rotation angle computation unit 41 computes a rotation angle $\theta_m$ of the electric motor 18 on the basis of a signal output from the rotation angle sensor 25. The target motor rotation angle setting unit 81 sets a target motor rotation angle $\theta_{m,tag}$ on the basis of the detected steering torque $T_{tb}$ detected by the torque sensor 11. The target motor rotation angle setting unit 81 includes a vehicle model 88 and an EPS reference model 89 used to define a desired EPS characteristic. In the present embodiment, the EPS reference model 89 is a virtual column-type EPS model in which friction is not generated in the power column. Hereinafter, the EPS reference model will be referred to as a frictionless column-type EPS model 89.

The vehicle model 88 receives, as an input, the target motor rotation angle $\theta_{m,tag}$ set by the frictionless column-type EPS model 89, and outputs an estimated load torque $T_{load1}$. The estimated load torque $T_{load1}$ is a value obtained by converting an estimated value of a load applied to the rack shaft 14 from the steered wheel 3 side illustrated in FIG. 1, into a load torque of the power column. In the present embodiment, the vehicle model 88 is a two-wheeled model described in "Automotive Vehicle Dynamics, Theory and Applications", written by Masato ABE, published by the Tokyo Denki University Press, second printing of the first edition, Sep. 20, 2009. The two-wheeled model is a model equivalent to a four-wheeled vehicle.

The frictionless column-type EPS model 89 receives, as an input, the detected steering torque $T_{tb}$ detected by the torque sensor 11 and the estimated load torque $T_{load1}$ computed by the vehicle model 88, and outputs the target motor rotation angle $\theta_{m,tag}$. Details of the frictionless column-type EPS model 89 will be described later.

The angle deviation computation unit 82 computes an angle deviation $\Delta\theta_{m1} = \theta_{m,tag} - \theta_{m,obs}$ between the target motor rotation angle $\theta_{m,tag}$ output from the target motor rotation angle setting unit 81 and an estimated motor rotation angle $\theta_{m,obs}$ output from the plant observer unit 86 (described later). The PD control unit 83 outputs the first assist torque correction value $T_{a,PD}$ by executing PD computation on the angle deviation $\Delta\theta_{m1}$ computed by the angle deviation computation unit 82.

The basic assist torque command value computation unit 47 computes the basic assist torque command value $T_b$ on the basis of the vehicle speed V detected by the vehicle speed sensor 26 and the detected steering torque $T_{tb}$ detected by the torque sensor 11. The first addition unit 84 computes the first assist torque command value $T_{ab}$ by adding together the basic assist torque command value $T_b$ computed by the basic assist torque command value computation unit 47 and the first assist torque correction value $T_{a,PD}$ computed by the PD control unit 83. The second addition unit 85 computes a second assist torque command value $T_{abc}$ by adding the second assist torque correction value $T_{a,FC}$ output from the friction compensation control unit 87 (described later) to the first assist torque command value $T_{ab}$ computed by the first addition unit 84.

The current command value computation unit 50 computes a current command value $I_m^*$ by dividing the assist torque command value $T_{abc}$ computed by the second addition unit 85 by a torque constant of the electric motor 18. The current deviation computation unit 51 computes a deviation $\Delta I_m = I_m^* - I_m$ between the current command value $I_m^*$ computed by the current command value computation unit 50 and the actual motor current $I_m$ detected by the current detecting circuit 33. The PI control unit 52 computes a voltage command value, which is a value of the voltage to be applied to the electric motor 18, by executing PI computation on the current deviation $\Delta I_m$ computed by the current deviation computation unit 51.

The PWM control unit 53 produces a PWM signal with a duty ratio corresponding to the voltage command value computed by the PI control unit 52, and supplies the produced PWM signal to the motor driving circuit 31. The motor driving circuit 31 is an H-bridge circuit and includes multiple power elements. The multiple power elements are turned on and off on the basis of the PWM signals supplied from the PWM control unit, whereby a voltage corresponding to the voltage command value is applied to the electric motor 18. The current deviation computation unit 51 and the PI control unit 52 constitute a current feedback controller. By the operation of the current feedback controller, the motor current passing through the electric motor 18 is controlled so as to approach the current command value $I_m^*$.

The plant observer unit 86 and the friction compensation control unit 87 will be described below in detail. FIG. 12 is a block diagram illustrating the configuration of the plant observer unit 86. The plant observer unit 86 includes a vehicle model 91, a frictionless column-type EPS model 92, a first reduction ratio multiplying unit 93, an angle deviation computation unit 94, a first gain multiplying unit 95, a motor angular velocity computation unit 96, a second reduction ratio multiplying unit 97, an angular velocity deviation computation unit 98, and a second gain multiplying unit 99.

The vehicle model 91 receives, as an input, an estimated worm wheel angular velocity $\omega_{ww,obs}$ computed by the frictionless column-type EPS model 92, and outputs an estimated load torque $T_{load2}$. The estimated load torque $T_{load2}$ is an estimated value of the load torque that is applied from the steered wheel 3 side to the rack shaft 14. In the present embodiment, the vehicle model 91 is a two-wheeled model described in "Automotive Vehicle Dynamics, Theory and Applications", written by Masato ABE, published by the Tokyo Denki University Press, second printing of the first edition, Sep. 20, 2009. The two-wheeled model is a model equivalent to a four-wheeled vehicle.

The frictionless column-type EPS model 92 is a virtual column-type EPS model in which friction is not generated in the power column. Note that, the configuration of the frictionless column-type EPS model 92 is corrected by a first model correction term $G1 \cdot \theta_{m2}$ and a second model correction term $G2 \cdot \Delta\omega_m$ (described later).

The detected steering torque $T_{tb}$ detected by the torque sensor 11, the estimated load torque $T_{load2}$ computed by the vehicle model 91, the first assist torque command value $T_{ab}$ computed by the first addition unit 84 illustrated in FIG. 11, the first model correction term $G1 \cdot \Delta\theta_{m2}$, and the second model correction term $G2 \cdot \Delta\omega_m$ are input into the frictionless column-type EPS model 92. The frictionless column-type EPS model 92 computes the estimated worm wheel rotation angle $\theta_{ww,obs}$, the estimated worm wheel angular velocity $\omega_{ww,obs}$, and the estimated worm wheel torque $T_{ww,obs}$ in the case where the assumption is made that friction is not generated in the power column, on the basis of the above-described inputs.

The estimated worm wheel torque $T_{ww,obs}$ is the sum $(T_{tb} + T_{load2})$ of the detected steering torque $T_{tb}$ detected by the torque sensor 11 and the estimated load torque $T_{load2}$ computed by the vehicle model 91. Therefore, the estimated worm wheel torque $T_{ww,obs}$ is an estimated value of an external torque, which is applied to the speed reducer 19 and which is other than the motor torque. That is, the external torque specifying unit corresponds to the frictionless column-type EPS model 92 and the plant observer unit 86 including the model 92.

The first reduction ratio multiplying unit 93 computes the estimated motor rotation angle $\theta_{m,obs}$ by multiplying the estimated worm wheel rotation angle $\theta_{ww,obs}$ computed by the frictionless column-type EPS model 92 by the reduction ratio $i = \omega_{wg}/\omega_{ww}$ of the speed reducer 19. The angle deviation computation unit 94 computes an angle deviation $\Delta\theta_{m2} = \theta_{m,obs} - \theta_m$ between the motor rotation angle $\theta_m$ computed by the rotation angle computation unit 41 illustrated in FIG. 11 and the estimated motor rotation angle $\theta_{m,obs}$ computed by the first reduction ratio multiplying unit 93. The first gain multiplying unit 95 computes the first model correction term $G1 \cdot \Delta\theta_{m2}$ regarding the angle by multiplying the angle deviation $\Delta\theta_{m2}$ computed by the angle deviation computation unit 94 by a predetermined first gain G1.

The motor angular velocity computation unit 96 computes the angular velocity of a rotor of the electric motor 18 by subjecting the motor rotation angle $\theta_m$ computed by the rotation angle computation unit 41, to temporal differentiation. Hereinafter, the angular velocity of the electric motor 18 computed through the temporal differentiation will be referred to as an actual motor angular velocity $\omega_{m,meas}$. The second reduction ratio multiplying unit 97 computes the estimated motor angular velocity $\omega_{m,obs}$ by multiplying the estimated worm wheel angular velocity $\omega_{ww,obs}$ computed by the frictionless column-type EPS model 92 by the reduction ratio $i = \omega_{wg}/\omega_{ww}$ of the speed reducer 19.

The angular velocity deviation computation unit 98 computes an angular velocity deviation $\Delta\omega_{m2}=\omega_{m,obs}-\omega_{m,meas}$ between the actual motor angular velocity $\omega_{m,meas}$ computed by the motor angular velocity computation unit 96 and the estimated motor angular velocity $\omega_{m,obs}$ computed by the second reduction ratio multiplying unit 97. The second gain multiplying unit 99 computes the second model correction term $G2\cdot\Delta\omega_{m2}$ regarging the velocity by multiplying the angular velocity deviation $\Delta\omega_m$ computed by the angular velocity deviation computation unit 98 by a predetermined second gain G2.

The first model correction term $G1\cdot\Delta\omega_{m2}$ regarding the angle and the second model correction term $G2\cdot\Delta\omega_{m2}$ regarding the velocity are used to correct the configuration of the frictionless column-type EPS model 92. That is, the configuration of the frictionless column-type EPS model 92 is corrected such that the estimated motor rotation angle $\theta_{m,obs}$ computed on the basis of the output from the frictionless column-type EPS model 92 becomes equal to the actual motor rotation angle $\theta_m$ and the estimated motor angular velocity $\omega_{m,obs}$ computed on the basis of the output of the frictionless column-type EPS model 92 becomes equal to the actual motor angular velocity) $\omega_{m,meas}$.

The plant observer unit 86 includes a model obtained by correcting the model, which is formed on the assumption that friction is not generated in the power column, with the use of an actually-measured value. By the computation executed with the use of the same model, the estimated motor rotation angle $\theta_{m,obs}$ that is the output from the first reduction ratio multiplying unit 93, the actual motor angular velocity $\omega_{m,meas}$ that is the output from the second reduction ratio multiplying unit 97, and the estimated worm wheel torque $T_{ww,obs}$ are output from the plant observer unit 86.

Figure 13:
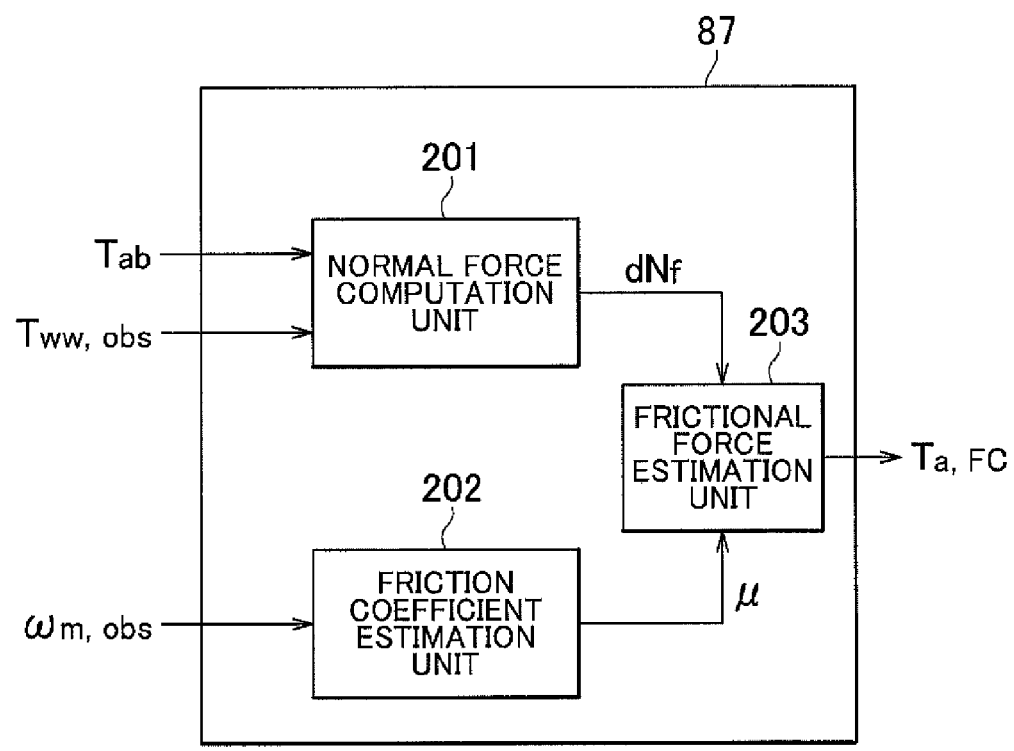
FIG. 13 is a block diagram illustrating the configuration of the friction compensation control unit.

FIG. 13 is a block diagram illustrating the configuration of the friction compensation control unit 87. The friction compensation control unit 87 computes the second assist torque correction value $T_{a,FC}$ with the use of the first assist torque command value $T_{ab}$ computed by the first addition unit 84 illustrated in FIG. 11, the estimated worm wheel torque $T_{ww,obs}$ and the estimated motor angular velocity $\omega_{m,obs}$ computed by the plant observer unit 86, and the above-mentioned control model 71.

The friction compensation control unit 87 includes a normal force computation unit 201, a friction coefficient estimation unit 202, and a frictional force estimation unit 203. The operation of the friction coefficient estimation unit 202 is the same as the operation of the friction coefficient estimation unit 62 illustrated in FIG. 3, and therefore description thereof will be omitted. The normal force computation unit 201 and the frictional force estimation unit 203 will be described below.

As described above, Expressions (19), (20) are expressions obtained by simplifying the equations of motion (13), (14) in the rotation direction with the use of the contact force variation $dN_c$ and the normal force $dN_f$.

$$J_{wg}\dot\omega_{wg}=T_{wg}-r_{wg}\cos(\beta_w)\sin(\gamma_w)dN_0-r_{wg}\mu dN_f\cos(\gamma_w) \quad (19)$$

$$J_{ww}\dot\omega_{ww}=T_{tb}+T_{load}+r_{ww}\cos(\beta_w)\cos(\gamma_w)dN_c-r_{ww}\mu dN_f\sin(\gamma_w) \quad (20)$$

Because $T_{tb}+T_{load}=T_{ww}$ is established, Expression (20) can be expressed by Expression (20a) using $T_{ww}$.

$$J_{ww}\dot\omega_{ww}=T_{ww}+r_{ww}\cos(\beta_w)\cos(\gamma_w)dN_c-r_{ww}\mu dN_f\sin(\gamma_w) \quad (20a)$$

With the use of the relationship of $\omega_{wg}=i\times\omega_{ww}$, by erasing $dN_f$ in Expressions (19), (20a), an equation of motion (28a) is obtained.

$$(J_{ww}+J_{wg}i^2)\dot\omega_{ww}=T_{ww}+iT_{wg}-\mu dN_f\frac{r_{ww}}{\sin(\gamma_w)} \quad (28a)$$

Because the fourth term in the right side of the equation of motion (28a) represents a frictional torque generated in the lower column, the torque ($\mu dN_f r_{ww}/\sin(\gamma_w)$) for compensating for the frictional torque is added, as the second assist torque correction value $T_{a,FC}$, to the first assist torque command value $T_{ab}$. The normal force computation unit 201 calculates the contact force variation $dN_c$ from Expressions (19), (20a) by setting $dN_f$ in Expressions (19), (20a) to 0, with the use of the relationship $\omega_{wg}=i\times\omega_{ww}$. At this time, the first assist torque command value $T_{ab}$ is used as $T_{wg}$. The estimated worm wheel torque $T_{ww,obs}$ computed by the plant observer unit 86 is used as $T_{ww}$. The basic assist torque command value $T_b$ may be used as $T_{wg}$.

The normal force computation unit 201 calculates the initial contact force $N_0$ on the basis of $N_0=F_0/\sin\beta_w$. When $N_0-|dN_c|>0$ is satisfied, the contact state is the double contact state. When $N_0-|dN_c|\leq 0$ is satisfied, the contact state is the single contact state. The normal force computation unit 201 computes the normal force $dN_f$ on the basis of Expression (32).

$$dN_f=\max(|dN_c|,N_0) \quad (32)$$

The frictional force $F_{fric,comp}$ is expressed by Expression (33).

$$F_{fric,comp}=\mu dN_f \quad (33)$$

The frictional force estimation unit 203 computes the second assist torque correction value $T_{a,FC}$ on the basis of Expression (34).

$$T_{a,FC}=\mu dN_f r_{ww}/\sin(\gamma_w) \quad (34)$$

In the second embodiment as well as in the first embodiment, the friction that depends on the load transmitted to the speed reducer 19 can be taken into account and the variation of the friction coefficient that depends on the sliding velocity $v_s$ of the speed reducer 19 can be compensated for.

A model obtained by excluding the friction $F_{cf,ww}$, $F_{cf,wg}$, $T_{f,ww}$, and $T_{f,wg}$ in the power column from the typical column-type EPS simulation model 60 illustrated, for example, in FIG. 4 is used as the frictionless column-type EPS models 89, 92. A model obtained by excluding the friction $F_{cf,ww}$, $F_{cf,wg}$, $T_{f,ww}$, and $T_{f,wg}$ in the power column from the control model 71 illustrated in FIG. 6 may be used as the frictionless column-type EPS models 89, 92.

The vehicle models 88, 91 may be a vehicle model other than the above-mentioned two-wheeled vehicle model. Similarly, the frictionless column-type EPS models 89, 92 may be a model other than the above-mentioned two types of models. In the second embodiment, the frictionless column-type EPS model is used as the EPS reference model 89. Alternatively, another model having a desired EPS characteristic may be used.

In the second embodiment, the second assist torque command value $T_{abc}$ is computed by adding the second assist torque correction value $T_{a,FC}$ to the first assist torque command value $T_{ab}$ that is obtained by adding the first assist torque correction value $T_{a,PD}$ to the basic assist torque command value $T_b$. Alternatively, the second assist torque command value $T_{abc}$ may be computed by adding the second assist torque correction value $T_{a,FC}$ to the basic assist torque command value $T_b$. In this case, the basic assist torque command value $T_b$ instead of the first assist torque command value $T_{ab}$ is input into the plant observer unit 86 and the friction compensation control unit 87. By employing this method, the target motor rotation angle setting unit 81, the angle deviation computation unit 82, the PD control unit 83, and the first addition unit 84 may be omitted.

In the first and second embodiments, the electric motor 18 is a DC motor with a brush. Alternatively, the electric motor 18 may be, for example, an electric motor other than the DC motor with a brush, such as a three-phase brushless motor, or may be a linearly-driven motor such as a linear motor. The invention may be applied to a control system other than the column-type EPS, as long as the control system is a control system including an electric motor and a speed reducer that amplifies or reduces the torque output from the electric motor, such as a power window system of a vehicle, a wiper driving system, or a system using a ball screw. Note that, the invention may be implemented in various modified embodiments within the scope of the appended claims.

What is claimed is:

1. A control system comprising:
an electric motor;
a speed reducer that amplifies motor torque generated by the electric motor;
a steering torque detector configured to detect a steering torque;
a basic motor torque command value computation unit that computes a basic motor torque command value for the electric motor;
an external torque specifying unit that specifies external torque that is applied to the speed reducer and that is other than the motor torque;
a motor angular velocity computation unit that computes an angular velocity of the electric motor with use of a model formed on an assumption that friction is not generated in the speed reducer or with use of a model obtained by modifying the model formed on the assumption that friction is not generated in the speed reducer, based on an actually-measured motor angular velocity;
a friction compensation control unit that estimates friction to be compensated for, with use of the external torque specified by the external torque specifying unit, the angular velocity computed by the motor angular velocity computation unit, and a simulation model of the control system in which the friction to be compensated for including at least friction generated in the speed reducer out of friction generated in the control system is taken into account;
a motor torque command value computation unit that computes a motor torque command value that is a target value of the motor torque to be generated from the electric motor, with use of the friction estimated by the friction compensation control unit and the basic motor torque command value computed by the basic motor torque command value computation unit; and
a controller that controls the electric motor based on the motor torque command value computed by the motor torque command value computation unit.

2. The control system according to claim 1, wherein the friction compensation control unit includes:
a determination unit that determines a state of contact of the speed reducer with use of the external torque specified by the external torque specifying unit and the detected steering torque;
a friction coefficient estimation unit that estimates a friction coefficient of a power column that includes a friction coefficient of the speed reducer based on the angular velocity computed by the motor angular velocity computation unit; and
a frictional force estimation unit that computes and estimates the friction to be compensated for, based on a result of determination made by the determination unit, the friction coefficient estimated by the friction coefficient estimation unit, the external torque specified by the external torque specifying unit, and the angular velocity computed by the motor angular velocity computation unit.

3. The control system according to claim 2, wherein:
the determination unit is configured to determine whether the state of contact between two gears that constitute the speed reducer is a single contact state or a double contact state; and
the frictional force estimation unit is configured to compute the friction to be compensated for, with use of a computing expression corresponding to the result of determination made by the determination unit out of a friction computing expression for the single contact state and a friction computing expression for the double contact state that are set in advance.

4. The control system according to claim 3, further comprising:
a motor angular velocity detector that detects the angular velocity of the electric motor; and
a correction value computation unit that computes a motor torque correction value based on a deviation between the angular velocity computed by the motor angular velocity computation unit and the angular velocity detected by the motor angular velocity detector, wherein
the motor torque command value computation unit is configured to compute the motor torque command value with use of the basic motor torque command value computed by the basic motor torque command value computation unit, the motor torque correction value computed by the correction value computation unit, and the estimated friction that is estimated by the friction compensation control unit.

5. The control system according to claim 4, wherein the determination unit is configured to determine the state of contact of the speed reducer with use of the external torque specified by the external torque specifying unit and a value that is obtained by adding the motor torque correction value computed by the correction value computation unit to the basic motor torque command value computed by the basic motor torque command value computation unit.

6. The control system according to claim 2, further comprising:
a motor angular velocity detector that detects the angular velocity of the electric motor; and
a correction value computation unit that computes a motor torque correction value based on a deviation between the angular velocity computed by the motor angular velocity computation unit and the angular velocity detected by the motor angular velocity detector, wherein
the motor torque command value computation unit is configured to compute the motor torque command value with use of the basic motor torque command value computed by the basic motor torque command value computation unit, the motor torque correction value computed by the correction value computation unit, and the estimated friction that is estimated by the friction compensation control unit.

7. The control system according to claim 6, wherein the determination unit is configured to determine the state of contact of the speed reducer with use of the external torque specified by the external torque specifying unit and a value that is obtained by adding the motor torque correction value computed by the correction value computation unit to the basic motor torque command value computed by the basic motor torque command value computation unit.

8. The control system according to claim 2, wherein the friction coefficient estimation unit is configured to estimate the friction coefficient with use of the angular velocity computed by the motor angular velocity computation unit and a LuGre model wherein the simulation model includes the LuGre model.

9. The control system according to claim 1, wherein the friction compensation control unit includes:
a normal force computation unit that computes a normal force that acts on a tooth surface of the speed reducer, with use of the external torque specified by the external torque specifying unit and the basic motor torque command value computed by the detected steering torque;
a friction coefficient estimation unit that estimates a friction coefficient of a power column that includes a friction coefficient of the speed reducer based on the angular velocity computed by the motor angular velocity computation unit; and
a frictional force estimation unit that computes and estimates the friction to be compensated for, based on the normal force computed by the normal force computation unit and the friction coefficient estimated by the friction coefficient estimation unit.

10. The control system according to claim 9, further comprising:
a motor angular velocity detector that detects the angular velocity of the electric motor; and
a correction value computation unit that computes a motor torque correction value based on a deviation between the angular velocity computed by the motor angular velocity computation unit and the angular velocity detected by the motor angular velocity detector, wherein
the motor torque command value computation unit is configured to compute the motor torque command value with use of the basic motor torque command value computed by the basic motor torque command value computation unit, the motor torque correction value computed by the correction value computation unit, and the friction estimated by the friction compensation control unit.

11. The control system according to claim 10, wherein the normal force computation unit is configured to compute the normal force that acts on the tooth surface of the speed reducer with use of the external torque specified by the external torque specifying unit and a value that is obtained by adding the motor torque correction value computed by the correction value computation unit to the basic motor torque command value computed by the basic motor torque command value computation unit.

12. The control system according to claim 9, further comprising:
a target rotation angle setting unit that sets a target rotation angle of the electric motor; and
a correction value computation unit that computes a motor torque correction value based on a deviation between the target rotation angle set by the target rotation angle setting unit and the rotation angle computed by the motor rotation angle computation unit, wherein
the motor torque command value computation unit is configured to compute the motor torque command value with use of the basic motor torque command value computed by the basic motor torque command value computation unit, the motor torque correction value computed by the correction value computation unit, and the friction estimated by the friction compensation control unit.

13. The control system according to claim 12, wherein the normal force computation unit is configured to compute the normal force that acts on the tooth surface of the speed reducer with use of the external torque specified by the external torque specifying unit and a value that is obtained by adding the motor torque correction value computed by the correction value computation unit to the basic motor torque command value computed by the basic motor torque command value computation unit.

14. The control system according to claim 1, wherein:
the control system is a column assist-type electric power steering system;
the external torque includes steering torque applied to a steering member by a driver and load torque applied from a steered wheel to the speed reducer; and
the external torque specifying unit includes the steering torque detector that detects the steering torque and a load torque estimation unit that estimates the load torque.

15. The control system according to claim 14, further comprising:
a vehicle speed detector that detects a vehicle speed, wherein
the basic motor torque command value computation unit is configured to compute the basic motor torque command value based on the vehicle speed detected by the vehicle speed detector and the steering torque detected by the steering torque detector.

16. A control system comprising:
an electric motor;
a speed reducer configured to amplify motor torque generated by the electric motor;
a steering torque detector configured to detect a steering torque;
a processor programmed to:
compute a basic motor torque command value for the electric motor;
specify an external torque applied to the speed reducer, the external torque being other than the motor torque;
compute an angular velocity of the electric motor based on: (i) a first model formed on an assumption that friction is not generated in the speed reducer, or (ii) a second model obtained through modifying the first model based on an actual-measured motor angular velocity;
estimate a friction to be compensated for based on the specified external torque, the computed angular velocity, the detected steering torque, and a simulation model of the control system in which the friction to be compensated for, including at least friction generated in the speed reducer out of friction generated in the control system, is taken into account;
compute a motor torque command value that is a target value of the motor torque to be generated from the electric motor based on the estimated friction and the computed basic motor torque command value; and control the electric motor based on computed the motor torque command value.

\* \* \* \* \*